(12) United States Patent
Koide

(10) Patent No.: US 11,555,739 B2
(45) Date of Patent: Jan. 17, 2023

(54) DETECTION DEVICE

(71) Applicant: Japan Display Inc., Tokyo (JP)

(72) Inventor: Gen Koide, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/496,880

(22) Filed: Oct. 8, 2021

(65) Prior Publication Data

US 2022/0113186 A1 Apr. 14, 2022

(30) Foreign Application Priority Data

Oct. 12, 2020 (JP) .............................. JP2020-172172

(51) Int. Cl.
   *G01J 1/44* (2006.01)
   *G06V 40/13* (2022.01)
(52) U.S. Cl.
   CPC ............ *G01J 1/44* (2013.01); *G06V 40/1318* (2022.01)
(58) Field of Classification Search
   CPC .................................................. G06V 40/1318
   See application file for complete search history.

(56) References Cited

U.S. PATENT DOCUMENTS 8,424,764 B2 4/2013 Tanaka et al.
2022/0262158 A1\* 8/2022 Katsuta .................. H04N 5/374

FOREIGN PATENT DOCUMENTS

JP 2011-010054 A 1/2011

\* cited by examiner

*Primary Examiner* — Georgia Y Epps
*Assistant Examiner* — Don J Williams
(74) *Attorney, Agent, or Firm* — K&L Gates LLP

(57) ABSTRACT

A detection device includes: detection elements; scan lines coupled to the detection elements and configured to supply drive signals to the detection elements; output signal lines coupled to the detection elements, detection signals from the detection elements being output to the output signal lines; a drive circuit configured to supply the drive signals to the detection elements; and a detection circuit configured to be supplied with the detection signals through the output signal lines. Each detection element includes a photoelectric conversion element, a source follower transistor configured to output a signal corresponding to an electrical charge of the photoelectric conversion element, and a read transistor configured to read the output signal of the source follower transistor and output the detection signal. During a reset period, an initial voltage obtained by superimposing a reference voltage on a threshold voltage of the source follower transistor is applied to the photoelectric conversion element.

5 Claims, 18 Drawing Sheets

DETECTION DEVICE

CROSS-REFERENCE TO RELATED APPLICATION

This application claims the benefit of priority from Japanese Patent Application No. 2020-172172 filed on Oct. 12, 2020, the entire contents of which are incorporated herein by reference.

BACKGROUND

1. Technical Field

What is disclosed herein relates to a detection device.

2. Description of the Related Art

For example, photoelectric conversion devices are known that use a positive-intrinsic-negative (PIN) photodiode as a photoelectric conversion element for detection (refer, for example, to Japanese Patent Application Laid-open Publication No. 2011-010054). Such a photoelectric conversion device is provided with a source follower transistor for each pixel, and the source follower transistor includes a field-effect transistor for receiving, at the gate thereof, a signal charge generated by a photoelectric converter, and reads out a signal voltage corresponding to the signal charge, which has been received by the field-effect transistor, to a signal line. In the photoelectric conversion device, an electric charge based on input information photoelectrically converted by the photoelectric converter is transferred to an external capacitor, and the external capacitor converts the electric charge into a signal voltage.

A detection device using the PIN photodiode is required to be increased in detection sensitivity. For example, a photocurrent of the PIN photodiode can be increased by increasing the sensor area. To increase the detection sensitivity, the resolution needs to be increased. To achieve both the increase in the sensor area and the increase in the resolution, miniaturization of the source follower transistor leads to an increase in variation of a threshold voltage, which may cause reduction in detection accuracy.

For the foregoing reasons, there is a need for a detection device capable of increasing the detection accuracy.

SUMMARY

According to an aspect, a detection device includes: a plurality of detection elements arranged in a matrix having a row-column configuration in a detection region; a plurality of scan lines coupled to the detection elements arranged in a first direction and configured to supply a plurality of drive signals to the detection elements; a plurality of output signal lines coupled to the detection elements arranged in a second direction different from the first direction, detection signals from the detection elements being output to the output signal lines; a drive circuit configured to supply the drive signals to the detection elements; and a detection circuit configured to be supplied with the detection signals through the output signal lines. Each of the detection elements includes a photoelectric conversion element, a source follower transistor configured to output a signal corresponding to an electrical charge generated in the photoelectric conversion element, and a read transistor configured to read the output signal of the source follower transistor and output the detection signal. During a reset period, an initial voltage obtained by superimposing a predetermined reference voltage on a threshold voltage of the source follower transistor is applied to the photoelectric conversion element.

DETAILED DESCRIPTION

Figure 1A:
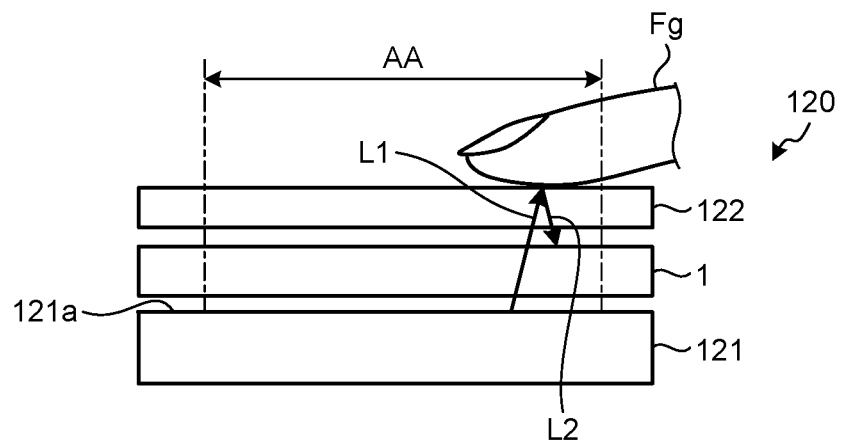
FIG. 1A is a sectional view illustrating a schematic sectional configuration of a detection apparatus having an illumination device, the detection apparatus including a detection device according to an embodiment.

The following describes a mode (embodiment) for carrying out the present disclosure in detail with reference to the drawings. The present disclosure is not limited to the description of the embodiment given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the disclosure. To further clarify the description, widths, thicknesses, shapes, and the like of various parts may be schematically illustrated in the drawings as compared with actual aspects thereof. However, they are merely examples, and interpretation of the present disclosure is not limited thereto. The same component as that described with reference to an already mentioned drawing is denoted by the same reference numeral through the description and the drawings, and detailed description thereof may not be repeated where appropriate.

In the present specification and claims, in expressing an aspect of disposing another structure on or above a certain structure, a case of simply expressing "on" includes both a case of disposing the other structure immediately on the certain structure so as to contact the certain structure and a case of disposing the other structure above the certain structure with still another structure interposed therebetween, unless otherwise specified.

FIG. 1A is a sectional view illustrating a schematic sectional configuration of a detection apparatus having an illumination device, the detection apparatus including a detection device according to the embodiment. As illustrated in FIG. 1A, a detection apparatus 120 having an illumination device includes a detection device 1, an illumination device 121, and a cover glass 122. The illumination device 121, the detection device 1, and the cover glass 122 are stacked in the order as listed, in a direction orthogonal to a surface of the detection device 1.

The illumination device 121 has a light-emitting surface 121a for emitting light, and emits light L1 from the light-emitting surface 121a toward the detection device 1. The illumination device 121 is a backlight. The illumination device 121 may be, for example, what is called a side light-type backlight that includes a light guide plate provided at a location corresponding to a detection region AA and a plurality of light sources aligned at one end or both ends of the light guide plate. For example, light-emitting diodes (LEDs) for emitting light in a predetermined color are used as the light sources. The illumination device 121 may be what is called a direct-type backlight that includes light sources (such as LEDs) provided directly below the detection region AA. The illumination device 121 is not limited to the backlight, and may be provided on a lateral side or an upper side of the detection device 1 and may emit the light L1 from the lateral side or the upper side of a finger Fg.

The detection device 1 is provided so as to face the light-emitting surface 121a of the illumination device 121. The light L1 emitted from the illumination device 121 passes through the detection device 1 and the cover glass 122. The detection device 1 can detect a detection target (asperities (such as a fingerprint) on a surface of the finger Fg in the example illustrated in FIG. 1) by detecting light L2 reflected by an interface between the cover glass 122 and air. The color of the light L1 from the illumination device 121 may be varied depending on the detection target.

The cover glass 122 is a member for protecting the detection device 1 and the illumination device 121 and covers the detection device 1 and the illumination device 121. The cover glass 122 is, for example, a glass substrate. The cover glass 122 is not limited to the glass substrate, and may be, for example, a resin substrate. The cover glass 122 may not be provided. In this case, the surface of the detection device 1 is provided with a protective layer, and the detection target (herein, the finger Fg) contacts the protective layer of the detection device 1.

The detection apparatus 120 having an illumination device may be provided with a display panel instead of the illumination device 121. The display panel may be, for example, an organic electroluminescent (EL) diode (organic light-emitting diode (OLED)) panel or an inorganic EL display (micro-LED or mini-LED) panel. Alternatively, the display panel may be a liquid crystal display (LCD) panel using liquid crystal elements as display elements or an electrophoretic display (EPD) panel using electrophoretic elements as display elements.

Figure 1B:
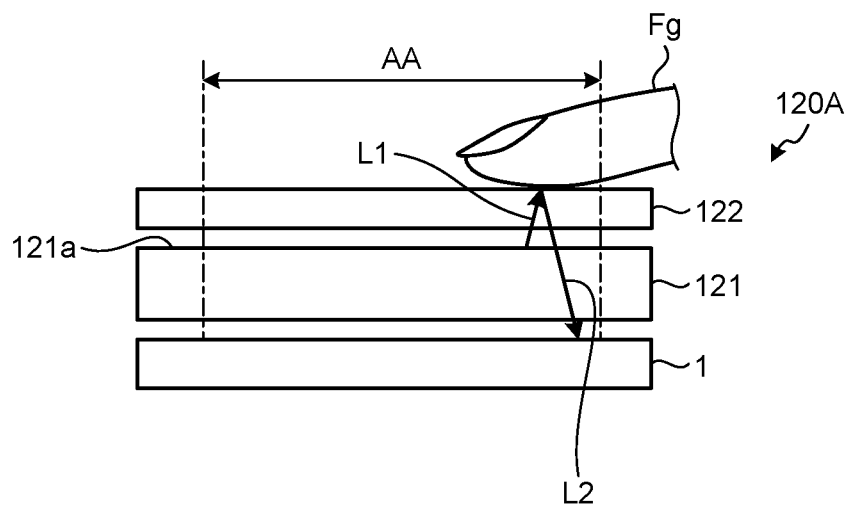
FIG. 1B is a sectional view illustrating a schematic sectional configuration of a detection apparatus having an illumination device according to a modification of the embodiment.

FIG. 1B is a sectional view illustrating a schematic sectional configuration of a detection apparatus having an illumination device according to a modification of the embodiment. As illustrated in FIG. 1B, the detection device 1, the illumination device 121, and the cover glass 122 in a detection apparatus 120A having an illumination device are stacked in the order as listed, in the direction orthogonal to the surface of the detection device 1. Also in the present modification, the display panel such as the organic EL display panel can be employed as the illumination device 121.

The light L1 emitted from the illumination device 121 passes through the cover glass 122, and then, is reflected by the finger Fg. The light L2 reflected by the finger Fg passes through the cover glass 122, and further passes through the illumination device 121. The detection device 1 can detect information on a living body, for example, can detect the fingerprint by receiving the light L2 that has passed through the illumination device 121.

Figure 2:
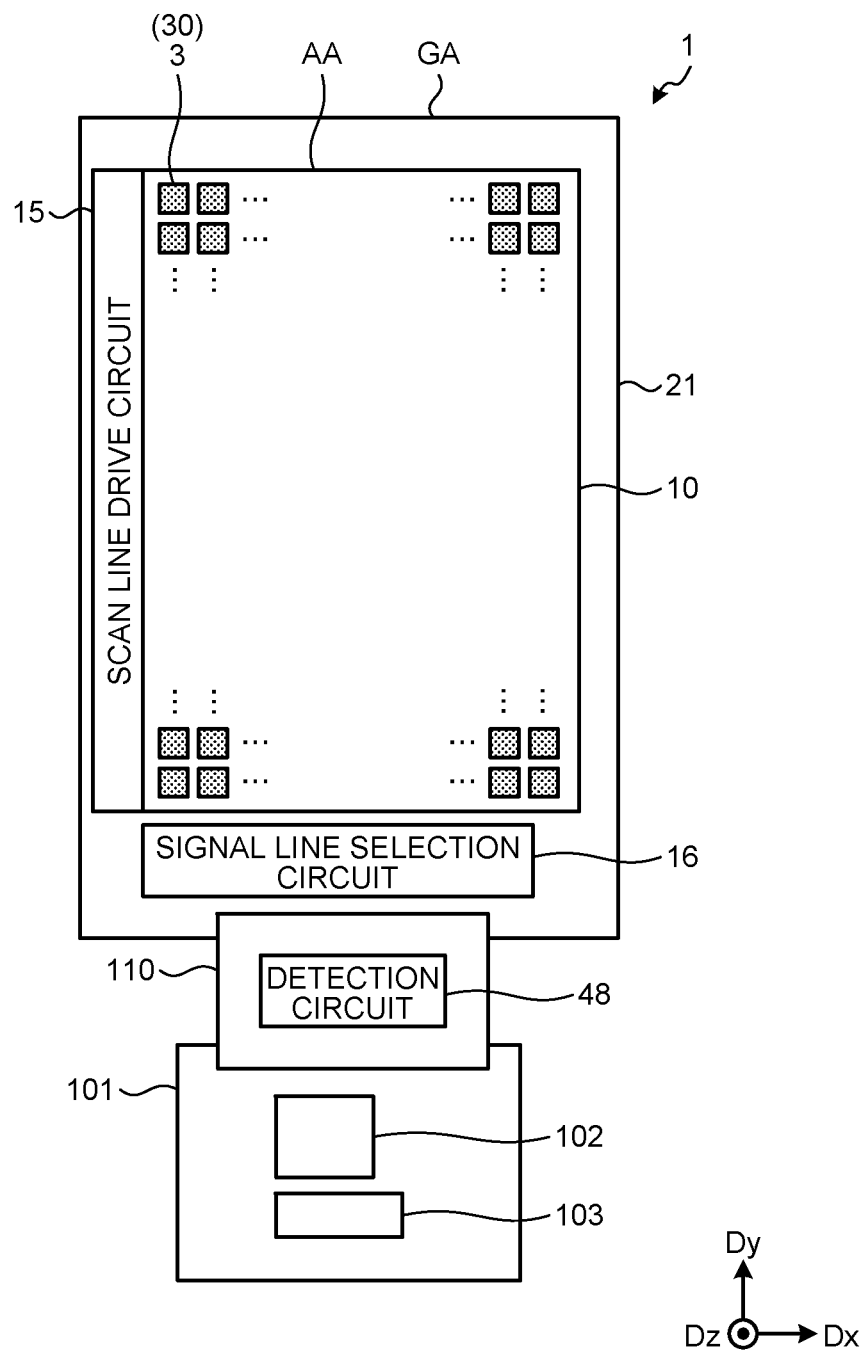
FIG. 2 is a plan view illustrating the detection device according to the embodiment.

FIG. 2 is a plan view illustrating the detection device according to the embodiment. As illustrated in FIG. 2, the detection device 1 includes a substrate 21, a sensor 10, a scan line drive circuit 15, a signal line selection circuit 16, a detection circuit 48, a control circuit 102, and a power supply circuit 103.

The substrate 21 is electrically coupled to a control substrate 101 through a wiring substrate 110. The wiring substrate 110 is, for example, a flexible printed circuit board or a rigid circuit board. The wiring substrate 110 is provided with the detection circuit 48. The control substrate 101 is provided with the control circuit 102 and the power supply circuit 103. The control circuit 102 is, for example, a field-programmable gate array (FPGA). The control circuit 102 supplies control signals to the sensor 10, the scan line drive circuit 15, and the signal line selection circuit 16 to control detecting operations of the sensor 10. The power supply circuit 103 supplies voltage signals including, for example, a power supply voltage VDD, a reset voltage Vrst, and a reference voltage COM (refer to FIG. 4) to the sensor 10, the scan line drive circuit 15, and the signal line selection circuit 16.

The substrate 21 has the detection region AA and a peripheral region GA. The detection region AA is a region overlapping a plurality of detection elements 3 included in the sensor 10. The peripheral region GA is a region outside the detection region AA, and is a region not overlapping the detection elements 3. That is, the peripheral region GA is a region between the outer circumference of the detection region AA and edges of the substrate 21. The scan line drive circuit 15 and the signal line selection circuit 16 are provided in the peripheral region GA.

Each of the detection elements 3 of the sensor 10 is a photosensor including a photoelectric conversion element 30. The photoelectric conversion element 30 is a photodiode and is a photodetector that outputs an electrical signal corresponding to light irradiating each of the photoelectric conversion elements 30. More specifically, the photoelectric conversion element 30 is a positive-intrinsic-negative (PIN) photodiode. The detection elements 3 are arranged in a matrix having a row-column configuration in the detection region AA. The photoelectric conversion element 30 included in each of the detection elements 3 performs the detection in accordance with a gate drive signal (for example, a reset control signal RST or a read control signal RD) supplied from the scan line drive circuit 15. Each of the photoelectric conversion elements 30 outputs the electrical signal corresponding to the light irradiating the photoelectric conversion element 30 as a detection signal Vdet to the signal line selection circuit 16. The detection device 1 detects the information on the living body based on the detection signals Vdet received from the photoelectric conversion elements 30.

The scan line drive circuit 15 and the signal line selection circuit 16 are provided in the peripheral region GA. Specifically, the scan line drive circuit 15 is provided in a region extending along a second direction Dy in the peripheral region GA; and the signal line selection circuit 16 is provided in a region extending along a first direction Dx in the peripheral region GA, and is provided between the sensor 10 and the detection circuit 48.

The first direction Dx is one direction in a plane parallel to the substrate 21. The second direction Dy is another direction in the plane parallel to the substrate 21, and is a direction orthogonal to the first direction Dx. The second direction Dy may non-orthogonally intersect the first direction Dx. A third direction Dz is a direction orthogonal to the first direction Dx and the second direction Dy, and is a direction normal to the substrate 21.

Figure 3:
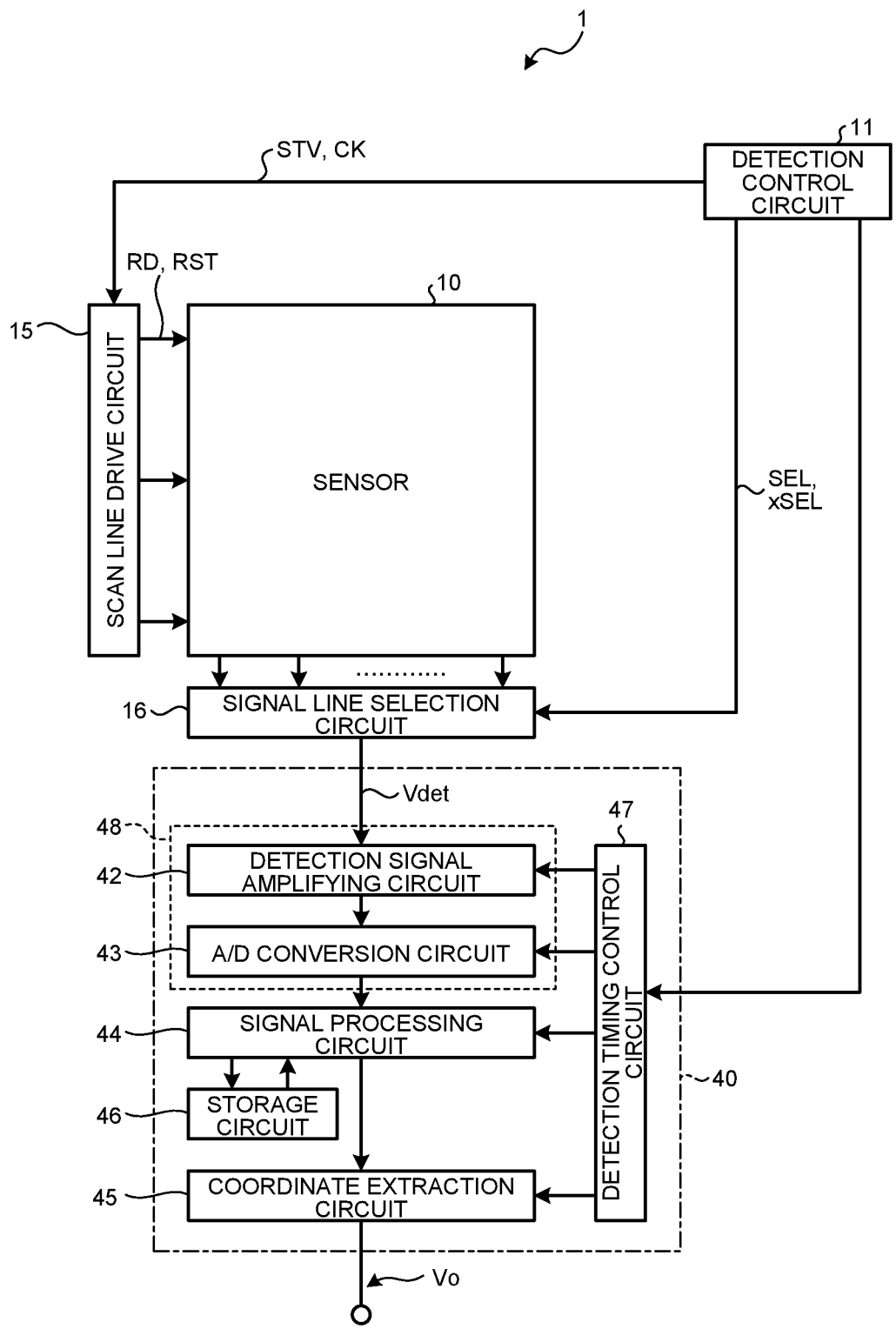
FIG. 3 is a block diagram illustrating a configuration example of the detection device according to the embodiment.

FIG. 3 is a block diagram illustrating a configuration example of the detection device according to the embodiment. As illustrated in FIG. 3, the detection device 1 further includes a detection control circuit 11 and a detector 40. One, some, or all functions of the detection control circuit 11 may be included in the control circuit 102. One, some, or all functions of the detector 40 other than those of the detection circuit 48 may also be included in the control circuit 102.

The detection control circuit 11 is a circuit that supplies a control signal to each of the scan line drive circuit 15, the signal line selection circuit 16, and the detector 40 to control operations of these components. The detection control circuit 11 supplies various control signals including, for example, a start signal STV and a clock signal CK to the scan line drive circuit 15. The detection control circuit 11 also supplies various control signals including, for example, a first selection signal SEL and a second selection signal xSEL to the signal line selection circuit 16.

The scan line drive circuit 15 is a circuit that drives a plurality of gate lines (the read control scan lines GLrd and the reset control scan lines GLrst (refer to FIG. 4)) based on various control signals. The scan line drive circuit 15 sequentially or simultaneously selects the gate lines, and supplies the gate drive signal (for example, the reset control signal RST or the read control signal RD) to the selected gate lines. Through this operation, the scan line drive circuit 15 selects the photoelectric conversion elements 30 coupled to the gate lines.

Figure 4:
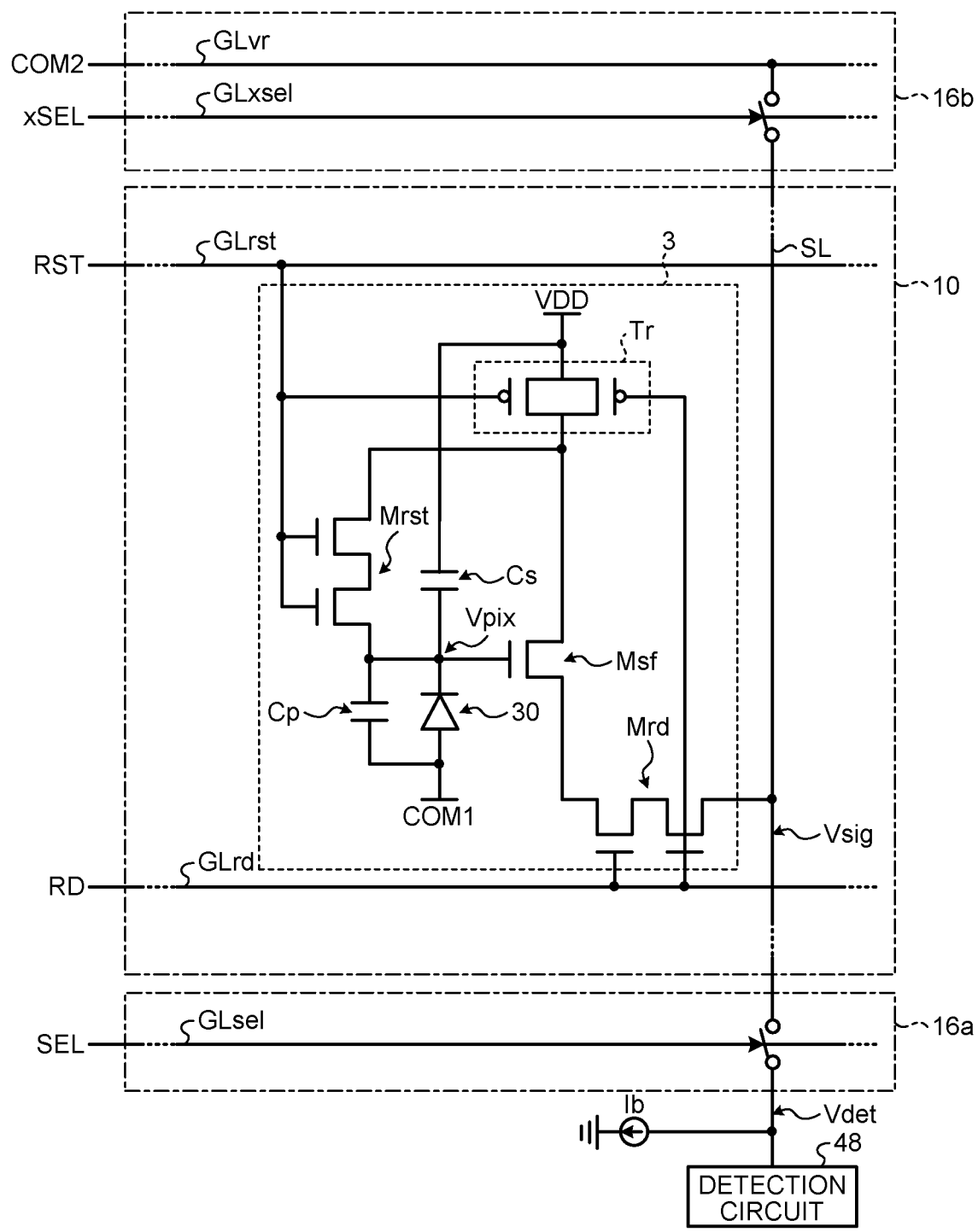
FIG. 4 is a circuit diagram illustrating a detection element according to the embodiment.

The signal line selection circuit 16 is a switch circuit for switching a coupling partner of an output signal line SL (refer to FIG. 4) between the detection circuit 48 of the detector 40 and a reference voltage supply line GLvr for supplying a second reference voltage COM2 (refer to FIG. 4). The signal line selection circuit 16 is, for example, a multiplexer. The signal line selection circuit 16 couples the selected output signal line SL to the detection circuit 48 based on the first selection signal SEL supplied from the detection control circuit 11 through a first selection signal supply line GLsel. By this operation, the signal line selection circuit 16 outputs the detection signal Vdet of the photoelectric conversion element 30 to the detector 40. In the present embodiment, the signal line selection circuit 16 supplies the second reference voltage COM2 to the selected output signal line SL based on the second selection signal xSEL supplied from the detection control circuit 11 through a second selection signal supply line GLxsel. The signal line selection circuit 16 may be included in the detector 40.

The detector 40 includes the detection circuit 48, a signal processing circuit 44, a coordinate extraction circuit 45, a storage circuit 46, and a detection timing control circuit 47. The detection timing control circuit 47 performs control to cause the detection circuit 48, the signal processing circuit 44, and the coordinate extraction circuit 45 to operate in synchronization with one another based on a control signal supplied from the detection control circuit 11.

The detection circuit 48 is, for example, an analog front end (AFE) circuit. The detection circuit 48 is a signal processing circuit having functions of at least a detection signal amplifying circuit 42 and an analog-to-digital (A/D) conversion circuit 43. The detection signal amplifying circuit 42 is a circuit that amplifies the detection signal Vdet, and is, for example, an integration circuit. The A/D conversion circuit 43 converts an analog signal output from the detection signal amplifying circuit 42 into a digital signal.

The signal processing circuit 44 is a logic circuit that detects a predetermined physical quantity received by the sensor 10 based on output signals of the detection circuit 48. The signal processing circuit 44 can detect asperities on a surface of the finger Fg or a palm based on the signals from the detection circuit 48 when the finger Fg is in contact with or in proximity to a detection surface. The signal processing circuit 44 may detect the information on the living body based on the signals from the detection circuit 48. Examples of the information on the living body include a blood vessel image, a pulse wave, pulsation, and blood oxygen saturation of the finger Fg or the palm.

The storage circuit 46 temporarily stores therein signals calculated by the signal processing circuit 44. The storage circuit 46 may be, for example, a random-access memory (RAM) or a register circuit.

The coordinate extraction circuit 45 is a logic circuit that obtains detected coordinates of the asperities on the surface of the finger Fg or the like when the contact or proximity of the finger Fg is detected by the signal processing circuit 44. The coordinate extraction circuit 45 is the logic circuit that also obtains detected coordinates of blood vessels of the finger Fg or the palm. The coordinate extraction circuit 45 combines the detection signals Vdet output from the respective detection elements 3 of the sensor 10 to generate two-dimensional information representing a shape of the asperities on the surface of the finger Fg or the like. The coordinate extraction circuit 45 may output the detection signals Vdet as sensor outputs Vo instead of calculating the detected coordinates.

The following describes a circuit configuration example of the detection device 1. FIG. 4 is a circuit diagram illustrating the detection element according to the embodiment. As illustrated in FIG. 4, the detection element 3 includes the photoelectric conversion element 30, a capacitor Cs, a reset transistor Mrst, a read transistor Mrd, a source follower transistor Msf, and a switch transistor Tr. A capacitance Cp represents parasitic capacitance of the photoelectric conversion element 30. The detection elements 3 are provided with the reset control scan lines GLrst and the read control scan lines GLrd as detection drive lines, and provided with the output signal lines SL as wiring for reading signals.

In the example illustrated in FIG. 4, the reset transistor Mrst and the read transistor Mrd each have what is called a double-gate structure configured by coupling two transistors in series, but are not limited to this structure, and may each have what is called a single-gate structure or a structure configured by coupling three or more transistors in series. The following description assumes that the reset transistor Mrst and the read transistor Mrd each have the single-gate structure.

While FIG. 4 illustrates one of the detection elements 3, the reset control scan lines GLrst, the read control scan lines GLrd, and the output signal lines SL are coupled to the detection elements 3. Specifically, the reset control scan lines GLrst and the read control scan lines GLrd extend in the first direction Dx (refer to FIG. 2), and are coupled to the detection elements 3 arranged in the first direction Dx. The output signal lines SL extend in the second direction Dy and are coupled to the detection elements 3 arranged in the second direction Dy.

Each of the read control scan lines GLrd is supplied with the read control signal RD from the scan line drive circuit 15. Each of the reset control scan lines GLrst is supplied with the reset control signal RST from the scan line drive circuit 15.

The reset transistor Mrst, the read transistor Mrd, the source follower transistor Msf, and the switch transistor Tr are provided for a corresponding one of the photoelectric conversion elements 30. The switch transistor Tr is a switch circuit including two transistors. Each of the transistors included in the reset transistor Mrst, the read transistor Mrd, and the source follower transistor Msf is formed with an n-type thin-film transistor (TFT). The two transistors included in the switch transistor Tr are each formed with a p-type TFT. However, the transistors in the reset transistor Mrst, the read transistor Mrd, and the source follower transistor Msf are not limited to the above-described constitutions, and may each be formed with a p-type TFT. The two transistors included in the switch transistor Tr may each be formed with an n-type TFT.

A first reference voltage COM1 is applied to the anode of the photoelectric conversion element 30. The first reference voltage COM1 is set to, for example, 2.9 [V]. The cathode of the photoelectric conversion element 30 is coupled to the gate of the source follower transistor Msf. The cathode of the photoelectric conversion element 30 is also coupled to the capacitor Cs, one of the source and the drain of the reset transistor Mrst, and the gate of the source follower transistor Msf. One end of the capacitor Cs is coupled to the cathode of the photoelectric conversion element 30, and the other end thereof is coupled to a supply terminal of a power supply voltage VDD. The power supply voltage VDD is set to, for example, 10 [V]. When light irradiates the photoelectric conversion element 30, a signal (voltage) output from the photoelectric conversion element 30 is stored in the capacitor Cs and capacitance Cp. While FIG. 4 illustrates the capacitor Cs as one element, the capacitor Cs actually includes a plurality of capacitors formed between different electrodes.

The gate of the reset transistor Mrst is coupled to the reset control scan line GLrst. The other of the source and the drain of the reset transistor Mrst is supplied with the power supply voltage VDD through the switch transistor Tr.

The source follower transistor Msf is coupled between the switch transistor Tr and the read transistor Mrd. The gate of the source follower transistor Msf is coupled to the cathode of the photoelectric conversion element 30.

The read transistor Mrd is coupled between the source of the source follower transistor Msf and the output signal line SL. The gate of the read transistor Mrd is coupled to the read control scan line GLrd. The drain of the read transistor Mrd is coupled to the output signal line SL. An alternative aspect may be such that the read transistor Mrd is coupled between the drain of the source follower transistor Msf and the output signal line SL; the gate of the read transistor Mrd is coupled to the read control scan line GLrd; and the source of the read transistor Mrd is coupled to the output signal line SL.

The switch transistor Tr serving as the switch circuit formed with the two transistors is coupled between the supply terminal of the power supply voltage VDD and the drain of the source follower transistor Msf. The drain of the source follower transistor Msf is coupled to the other of the source and the drain of the reset transistor Mrst.

In the present embodiment, when at least one of the read control signal RD and the reset control signal RST is at a low-level voltage (for example, −3 [V]), the switch transistor Tr supplies the power supply voltage VDD to the drain of the source follower transistor Msf and the other of the source and the drain of the reset transistor Mrst. The high-level voltage of the read control signal RD and the reset control signal RST is set to be, for example, 10 M. The configuration of the switch transistor Tr is not limited to the above-described configuration including two transistors. The configuration may be, for example, a configuration obtained by combining a NAND circuit with one transistor.

In the present embodiment, the signal line selection circuit 16 (refer to FIG. 3) includes a first signal line selection circuit 16a and a second signal line selection circuit 16b.

The output signal line SL is coupled to the detection circuit 48 through the first signal line selection circuit 16a. The output signal line SL is supplied with the second reference voltage COM2 through the second signal line selection circuit 16b.

When the first selection signal SEL is at the high-level voltage "H", the first signal line selection circuit 16a electrically couples the output signal line SL to the detection circuit 48. A constant-current source for supplying a bias current Ib to the read transistor Mrd is coupled to an input terminal of the detection circuit 48. This configuration enables detection of the detection signal Vdet applied to the output signal line SL by the detection element 3. The constant-current source may be provided in the detection circuit 48 or on the substrate 21.

When the second selection signal xSEL is at the high-level voltage "H", the second signal line selection circuit 16b electrically couples the output signal line SL to the reference voltage supply line GLvr. This operation supplies the second reference voltage COM2 to the output signal line SL. The second reference voltage COM2 is, for example, 2.5 [V].

Figure 5:
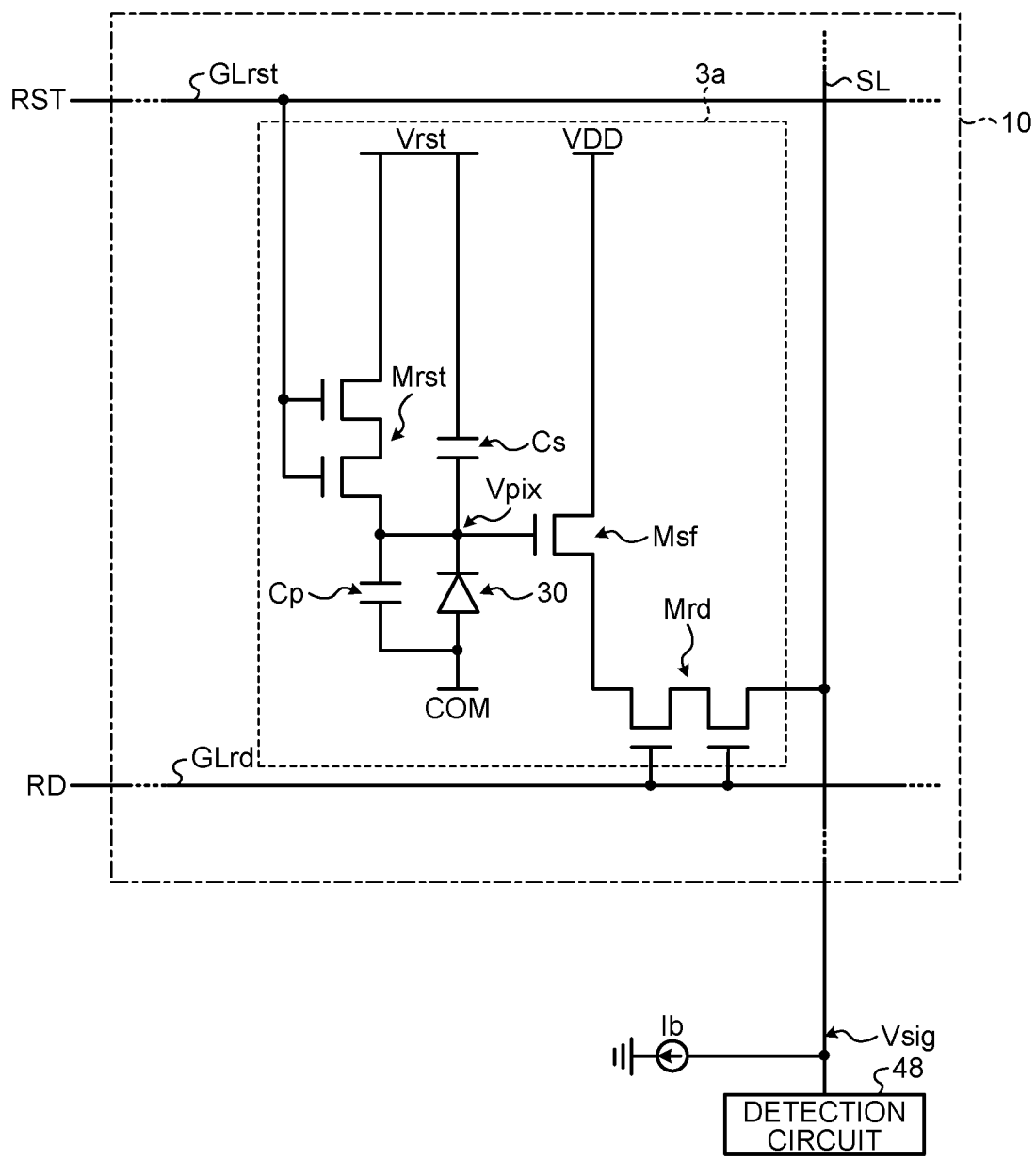
FIG. 5 is a circuit diagram illustrating a detection element according to a comparative example.

To facilitate the subsequent description, the following describes a circuit configuration example and an operation example of a detection device according to a comparative example. FIG. 5 is a circuit diagram illustrating a detection element according to the comparative example. As illustrated in FIG. 5, a detection element 3a according to the comparative example includes the photoelectric conversion element 30, the capacitor Cs, the reset transistor Mrst, the read transistor Mrd, and the source follower transistor Msf. The capacitance Cp represents the parasitic capacitance of the photoelectric conversion element 30. The detection element 3a is provided with the reset control scan line GLrst and the read control scan line GLrd as the detection drive lines, and provided with the output signal lines SL as the wiring for reading signals.

In the example illustrated in FIG. 5, the reset transistor Mrst and the read transistor Mrd each have what is called the double-gate structure configured by coupling the two transistors in series, but may each have what is called the single-gate structure in the same manner as in the detection element 3 according to the embodiment, or a structure configured by coupling three or more transistors in series. The following description assumes that the reset transistor Mrst and the read transistor Mrd each have the single-gate structure.

While FIG. 5 illustrates one of the detection elements 3a, the reset control scan lines GLrst, the read control scan lines GLrd, and the output signal lines SL are coupled to the detection elements 3a. Specifically, the reset control scan lines GLrst and the read control scan lines GLrd extend in the first direction Dx (refer to FIG. 2), and are coupled to the detection elements 3a arranged in the first direction Dx. The output signal lines SL extend in the second direction Dy, and are coupled to the detection elements 3a in the second direction Dy.

Each of the read control scan lines GLrd is supplied with the read control signal RD from the scan line drive circuit 15. Each of the reset control scan lines GLrst is supplied with the reset control signal RST from the scan line drive circuit 15.

The reset transistor Mrst, the read transistor Mrd, and the source follower transistor Msf are provided for a corresponding one of the photoelectric conversion elements 30. Each of the transistors in the reset transistor Mrst, the read transistor Mrd, and the source follower transistor Msf is formed with an n-type TFT or a p-type TFT.

A reference voltage COM is applied to the anode of the photoelectric conversion element 30. The reference voltage COM is set to, for example, 2.9 [V]. The cathode of the photoelectric conversion element 30 is coupled to the gate of the source follower transistor Msf. The cathode of the photoelectric conversion element 30 is also coupled to the capacitor Cs, one of the source and the drain of the reset transistor Mrst, and the gate of the source follower transistor Msf. One end of the capacitor Cs is coupled to the cathode of the photoelectric conversion element 30, and the other end thereof is coupled to a supply terminal of the reset voltage Vrst. The reset voltage Vrst is set to, for example, 4.9 [V]. When light irradiates the photoelectric conversion element 30, a signal (voltage) output from the photoelectric conversion element 30 is stored in the capacitor Cs and capacitance Cp. While FIG. 5 illustrates the capacitor Cs as one element, the capacitor Cs actually includes a plurality of capacitors formed between different electrodes.

The gate of the reset transistor Mrst is coupled to the reset control scan line GLrst. The other of the source and the drain of the reset transistor Mrst is coupled to the supply terminal of the reset voltage Vrst.

The source follower transistor Msf is coupled between the supply terminal of the power supply voltage VDD and the read transistor Mrd. The power supply voltage VDD is set to, for example, 10 V. The gate of the source follower transistor Msf is coupled to the cathode of the photoelectric conversion element 30.

The read transistor Mrd is coupled between the source of the source follower transistor Msf and the output signal line SL. The gate of the read transistor Mrd is coupled to the read control scan line GLrd. The drain of the read transistor Mrd is coupled to the output signal line SL. Alternative aspect may be such that the read transistor Mrd is coupled between the drain of the source follower transistor Msf and the output signal line SL; the gate of the read transistor Mrd is coupled to the read control scan line GLrd; and the source of the read transistor Mrd is coupled to the output signal line SL.

The constant-current source for supplying the bias current Ib to the read transistor Mrd is coupled to the input terminal of the detection circuit 48. This configuration enables the detection of the detection signal Vdet applied to the output signal line SL by the detection element 3a. The constant-current source may be provided in the detection circuit 48 or on the substrate 21.

Figure 6:
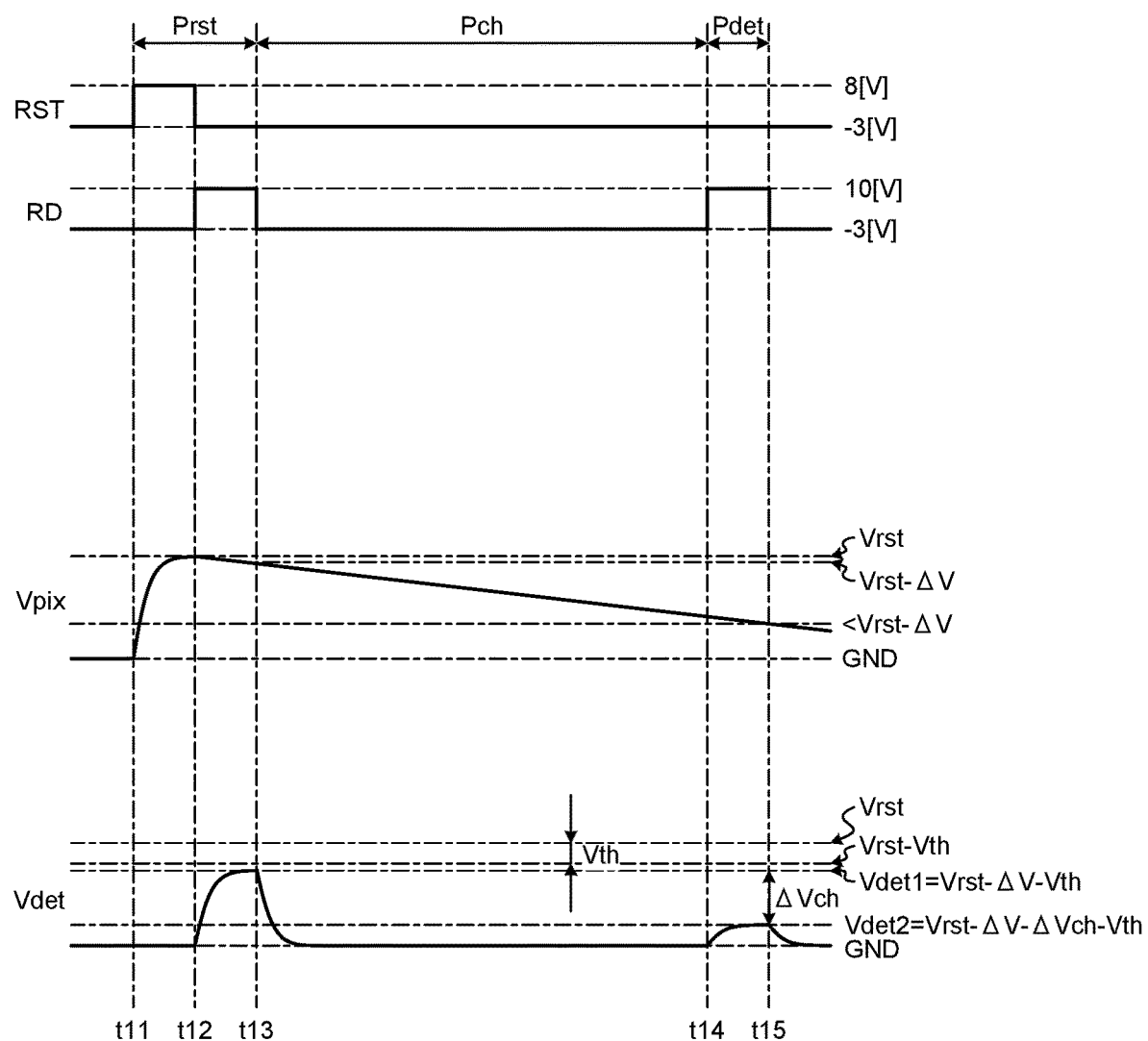
FIG. 6 is a timing waveform diagram illustrating an operation example of the detection element according to the comparative example.
Figure 7A:
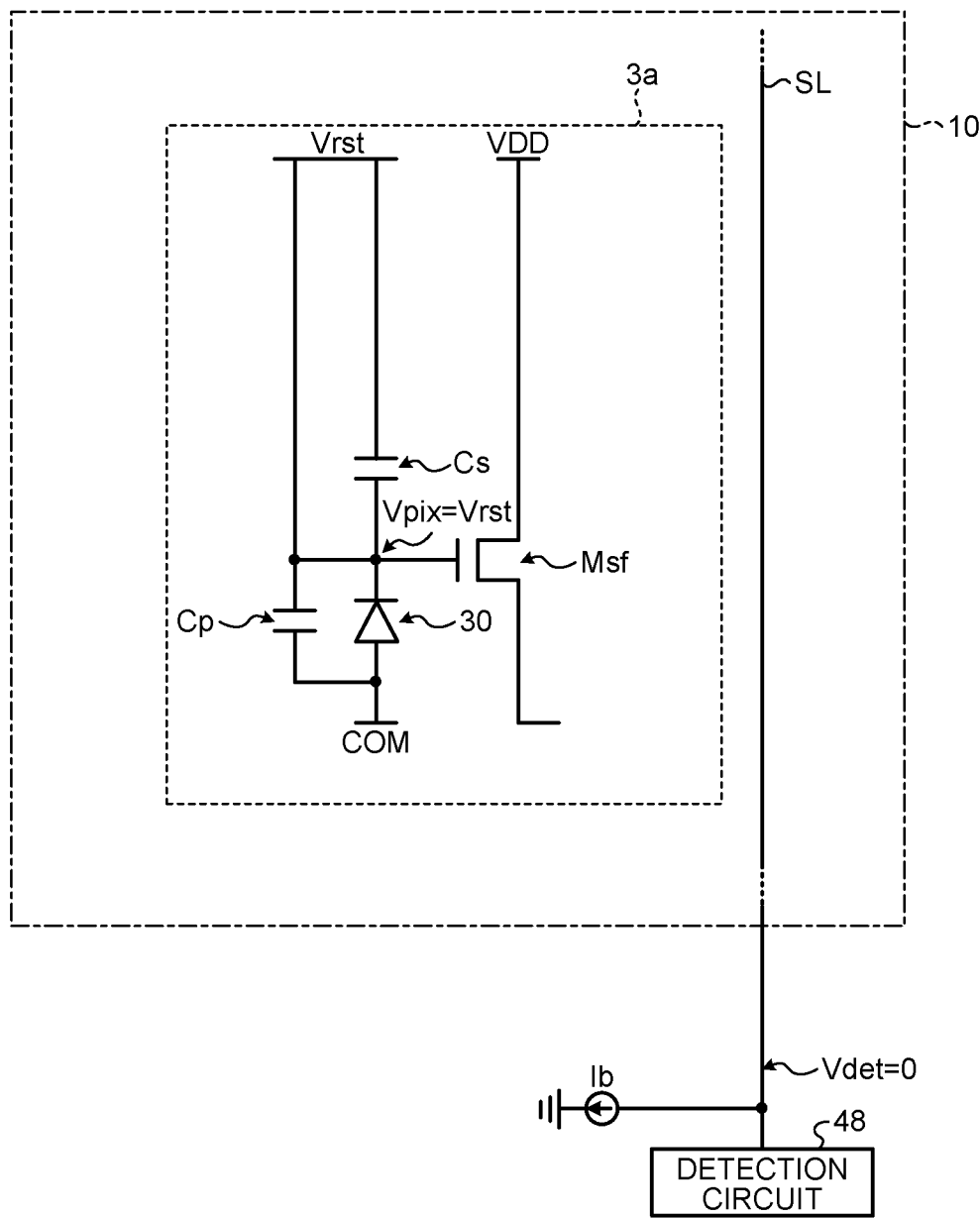
FIG. 7A is a diagram illustrating an equivalent circuit of the detection element during a period from t11 to t12 illustrated in FIG. 6.
Figure 7B:
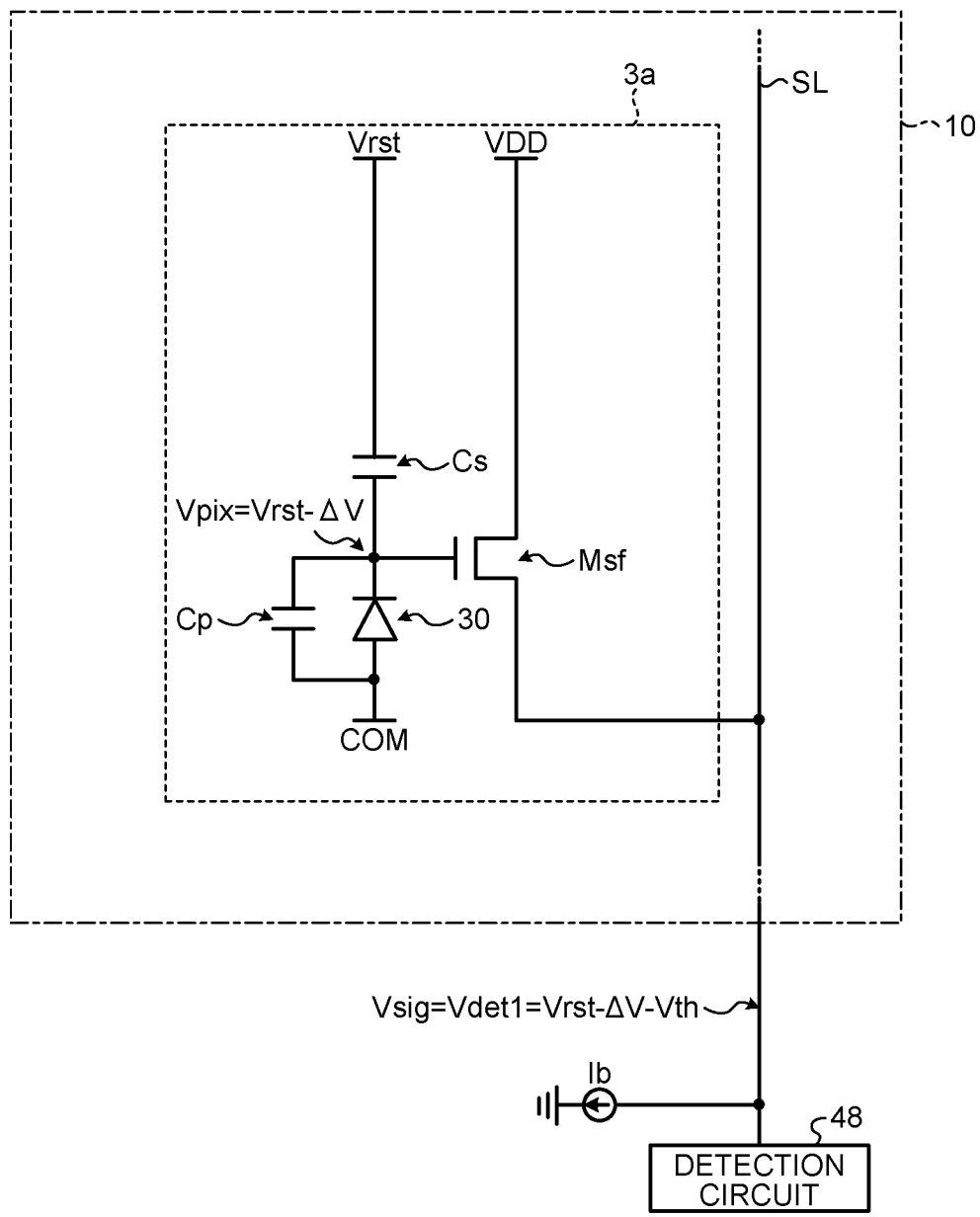
FIG. 7B is a diagram illustrating an equivalent circuit of the detection element during a period from t12 to t13 illustrated in FIG. 6.
Figure 7C:
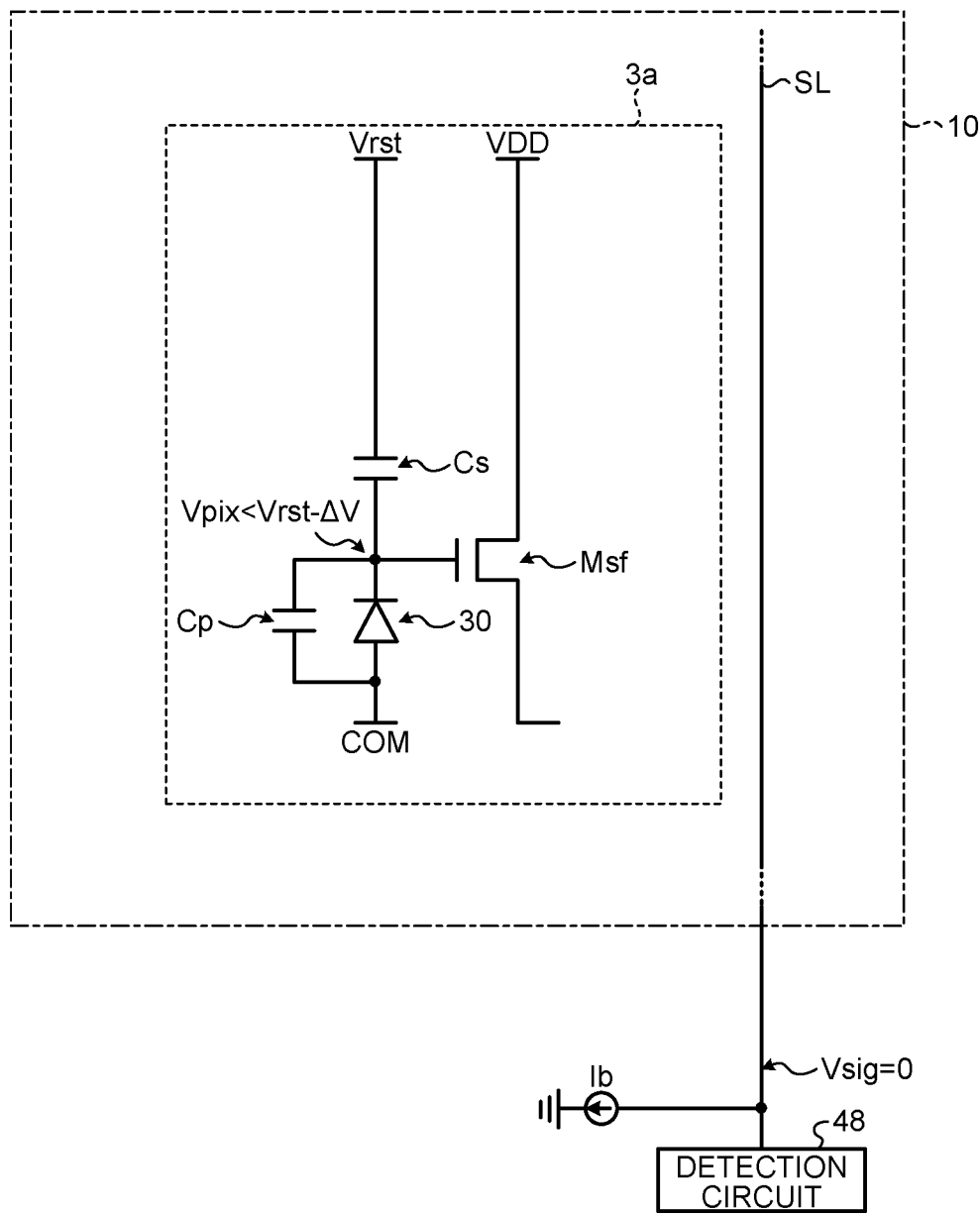
FIG. 7C is a diagram illustrating an equivalent circuit of the detection element during a period from t13 to t14 illustrated in FIG. 6.
Figure 7D:
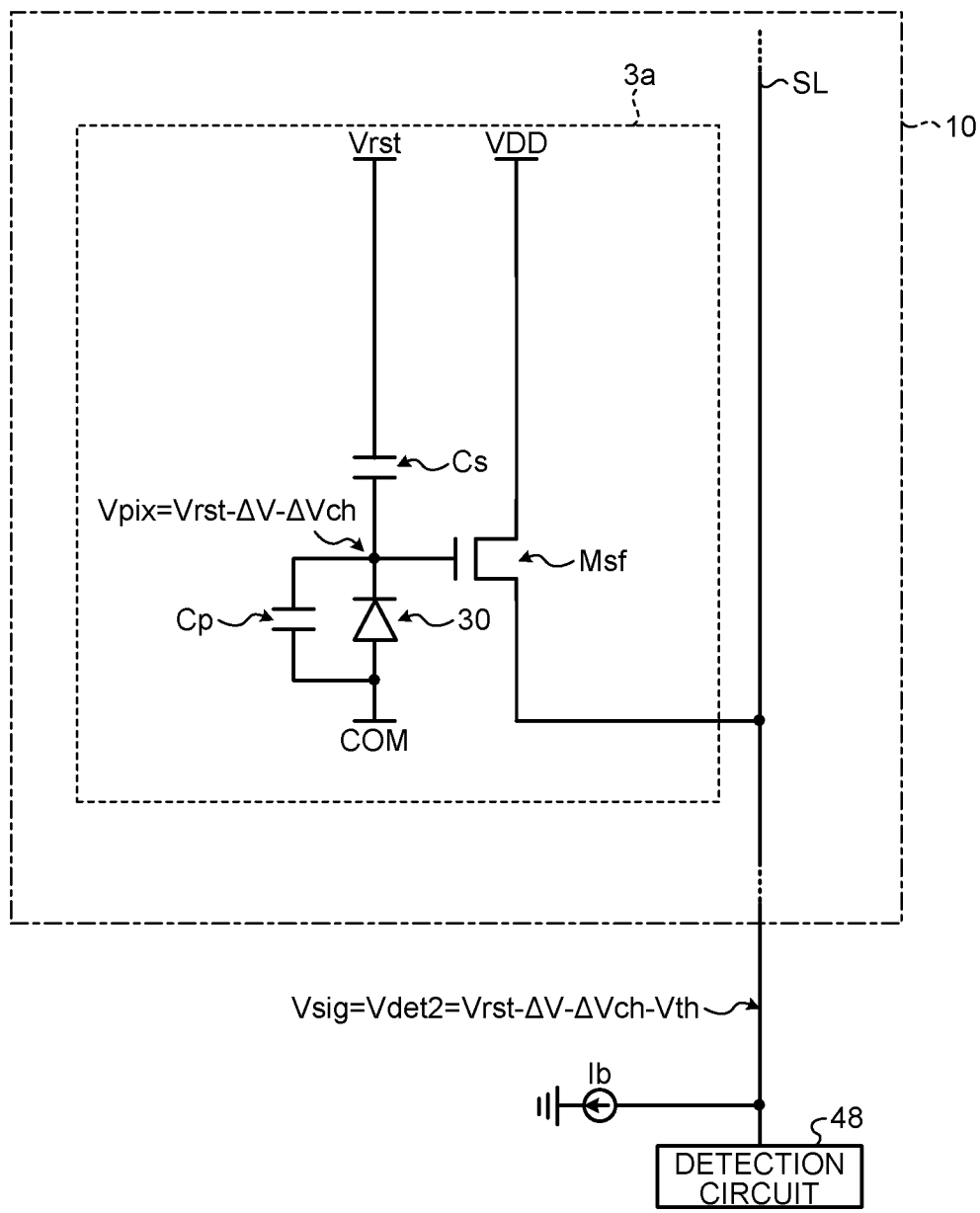
FIG. 7D is a diagram illustrating an equivalent circuit of the detection element during a period from t14 to t15 illustrated in FIG. 6.

FIG. 6 is a timing waveform diagram illustrating an operation example of the detection element according to the comparative example. FIG. 7A is a diagram illustrating an equivalent circuit of the detection element during a period from t11 to t12 illustrated in FIG. 6. FIG. 7B is a diagram illustrating an equivalent circuit of the detection element during a period from t12 to t13 illustrated in FIG. 6. FIG. 7C is a diagram illustrating an equivalent circuit of the detection element during a period from t13 to t14 illustrated in FIG. 6. FIG. 7D is a diagram illustrating an equivalent circuit of the detection element during a period from t14 to t15 illustrated in FIG. 6.

The detection element 3a performs the detection in the order of a reset period Prst, a storage period Pch, and a read period Pdet. The power supply circuit 103 supplies the reference voltage COM to the anode of the photoelectric conversion element 30 over the reset period Prst, the storage period Pch, and the read period Pdet. The reset period Prst is a period for setting, as an initial voltage, Vdet1 serving as a reference value of a voltage change amount of the detection signal Vdet corresponding to the light irradiating the photoelectric conversion element 30.

At time t11, the scan line drive circuit 15 sets the reset control signal RST to be supplied to the reset control scan line GLrst to the high-level voltage (for example, 8 [V]) to start the reset period Prst. At this time, the reset transistor Mrst is turned on (into a conduction state). This operation sets a cathode voltage Vpix of the photoelectric conversion element 30 to the reset voltage Vrst as represented by Expression (1) below (refer to FIG. 7A).

$$Vpix = Vrst \quad (1)$$

At time t12, the scan line drive circuit 15 sets the reset control signal RST to be supplied to the reset control scan line GLrst to the low-level voltage (for example, −3 [V]), and sets the read control signal RD to be supplied to the read control scan line GLrd to the high-level voltage (for example, 10 [V]). As a result, the reset transistor Mrst is turned off (into a non-conduction state), and the read transistor Mrd is turned on (into the conduction state).

As a result, at time t13, the cathode voltage Vpix of the photoelectric conversion element 30 is represented by Expression (2) below (refer to FIG. 7B). At this time, a voltage Vsig of the output signal line SL, that is, the voltage Vdet1 of the detection signal Vdet output from the output signal line SL is represented by Expression (3) below (refer to FIG. 7B). In Expressions (2) and (3) below, ΔV denotes a variation component of the signal corresponding to the light irradiating the photoelectric conversion element 30 during a period from time t12 to time t13, and Vth denotes a threshold voltage of the source follower transistor Msf.

$$Vpix = Vrst - \Delta V \quad (2)$$

$$Vsig = Vdet1 = Vrst - \Delta V - Vth \quad (3)$$

At time t13, the scan line drive circuit 15 sets the read control signal RD to the low-level voltage. This operation turns off the read transistor Mrd (into the non-conduction state), and starts the storage period Pch (period from time t13 to time t14).

During the storage period Pch, the cathode voltage Vpix of the photoelectric conversion element 30 is represented by Expression (4) below, and the voltage Vsig of the output signal line SL is represented by Expression (5) below (refer to FIG. 7C).

$$Vpix < Vrst - \Delta V \quad (4)$$

$$Vsig = 0 \quad (5)$$

At time t14, the scan line drive circuit 15 sets the read control signal RD to the high-level voltage. This operation turns on the read transistor Mrd (into the conduction state) to start the read period Pdet (period from time t14 to time t15).

As a result, at time t15, the cathode voltage Vpix of the photoelectric conversion element 30 is represented by Expression (6) below (refer to FIG. 7D). At this time, the voltage Vsig of the output signal line SL, that is, a voltage Vdet2 of the detection signal Vdet output from the output signal line SL is represented by Expression (7) below (refer to FIG. 7D). In Expressions (6) and (7) below, ΔVch denotes a variation component of the signal corresponding to the light irradiating the photoelectric conversion element 30 during the storage period Pch and the read period Pdet (during a period from time t13 to time t15).

$$Vpix = Vrst - \Delta V - \Delta Vch \quad (6)$$

$$Vsig = Vdet2 = Vrst - \Delta V - \Delta Vch - Vth \quad (7)$$

Expression (8) below represents a difference between the voltage Vdet1 of the detection signal Vdet at time t13 (Expression (3) above) and the voltage Vdet2 of the detection signal Vdet at time t15 (Expression (7) above). The detector 40 performs the detection processing based on the difference ΔVch.

$$Vdet1 - Vdet2 = \Delta Vch \quad (8)$$

In the detection element 3a according to the comparative example, the above-described voltages Vdet1 and Vdet2 of the detection signal Vdet each include the threshold voltage Vth of the source follower transistor Msf. The threshold voltage Vth of the source follower transistor Msf varies depending on the manufacturing process of the substrate 21.

Miniaturization of the manufacturing process of the substrate 21 tends to reduce the input value of the detection circuit 48, that is, the detection range of the detection signal Vdet.

Due to this tendency, sufficient detection sensitivity may not be obtained depending on the variation range of the threshold voltage Vth of the source follower transistor Msf.

Figure 8A:
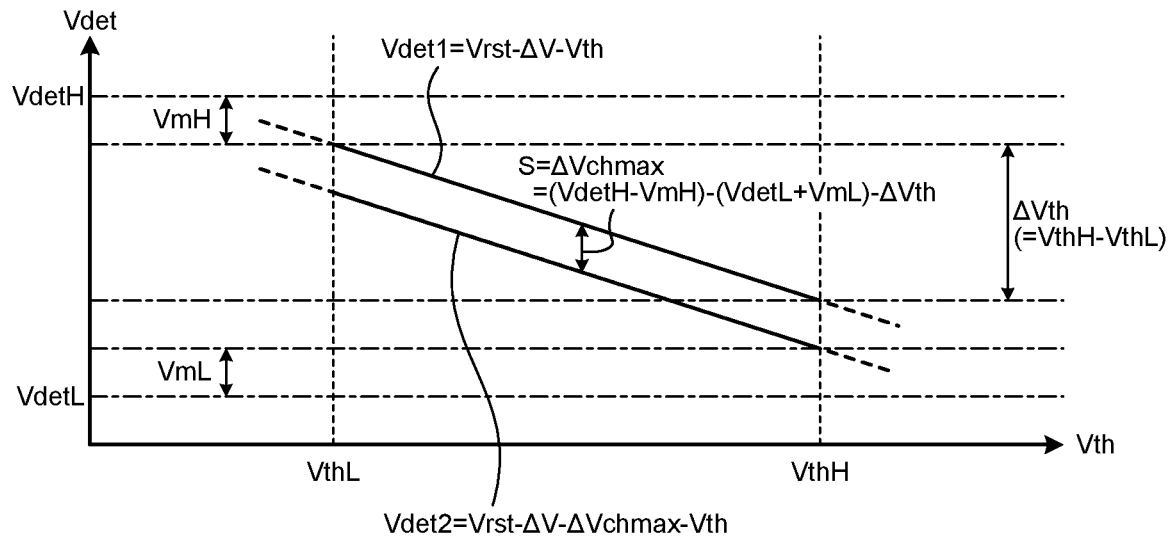
FIG. 8A is a diagram illustrating a relation between a detection range of a detection signal and a threshold voltage of a source follower transistor in the comparative example.

FIG. 8A is a diagram illustrating a relation between the detection range of the detection signal and the threshold voltage of the source follower transistor in the comparative example. In FIG. 8A, the horizontal axis represents the threshold voltage Vth of the source follower transistor Msf, and the vertical axis represents the detection signal Vdet. In FIG. 8A, VthH denotes an upper limit value of the threshold voltage Vth of the source follower transistor Msf, and VthL denotes a lower limit value of the threshold voltage Vth of the source follower transistor Msf. In FIG. 8A, VdetH denotes an upper limit value of the detection range of the detection signal Vdet, and VdetL denotes a lower limit value of the detection range of the detection signal Vdet. The upper limit value VdetH of the detection range of the detection signal Vdet is set to, for example, 2.9 [V]. The lower limit value VdetL of the detection range of the detection signal Vdet is set to, for example, 0.4 [V]. VmH and VmL denote voltage margins of the source follower transistor Msf taking into account temperature characteristics and reliability thereof. The voltage margins VmH and VmL are set to, for example, 0.4 [V]. That is, the detection range of the detection signal Vdet is set to be from VdetL+VmL (for example, 0.8 [V]) to VdetH−VmH (for example, 2.5 [V]).

As illustrated in FIG. 8A, when taking into account a difference ΔVth between the upper limit value VthH of the threshold voltage Vth of the source follower transistor Msf and the lower limit value VthL of the threshold voltage Vth of the source follower transistor Msf, detection sensitivity S, that is, a substantial maximum detection range ΔVchmax of the detection signal Vdet is represented by Expression (9) below (refer to FIG. 8A).

$$S = \Delta Vch\max \quad (9)$$
$$= (Vdet H - VmH) - (VdetL + VmL) - \Delta Vth$$

For example, when VdetH=2.9 [V], VdetL=0.4 [V], the voltage margin VmH=VmL=0.4 [V], and ΔVth=1.3 [V], the detection sensitivity S (=ΔVchmax) results in 0.4 [V].

Figure 8B:
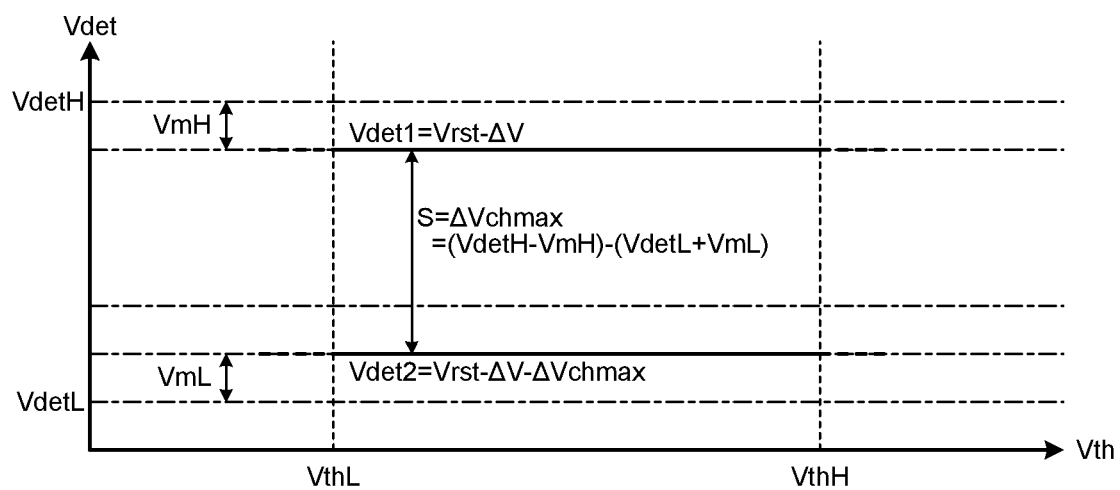
FIG. 8B is a diagram illustrating a relation between the detection range of the detection signal and the threshold voltage of the source follower transistor when a variation term of the threshold voltage of the source follower transistor is zero in FIG. 8A.

If ΔVth, that is, a variation term of the threshold voltage Vth of the source follower transistor Msf can be set to zero in Expression (9) above, the detection sensitivity S, that is, the substantial maximum detection range ΔVchmax of the detection signal Vdet is represented by Expression (10) below (refer to FIG. 8B). FIG. 8B is a diagram illustrating a relation between the detection range of the detection signal and the threshold voltage of the source follower transistor when the variation term of the threshold voltage of the source follower transistor is zero in FIG. 8A.

$$S = \Delta Vch\max = (VdetH - VmH) - (VdetL + VmL) \quad (10)$$

When VdetH=2.9 [V], VdetL=0.4 [V], and the voltage margin VmH=VmL=0.4 [V], the detection sensitivity S (=ΔVchmax) results in 1.7 [V]. Thus, the detection sensitivity S can be increased. The following describes an operation example of the detection device 1 having the configuration illustrated in FIG. 4.

Figure 9:
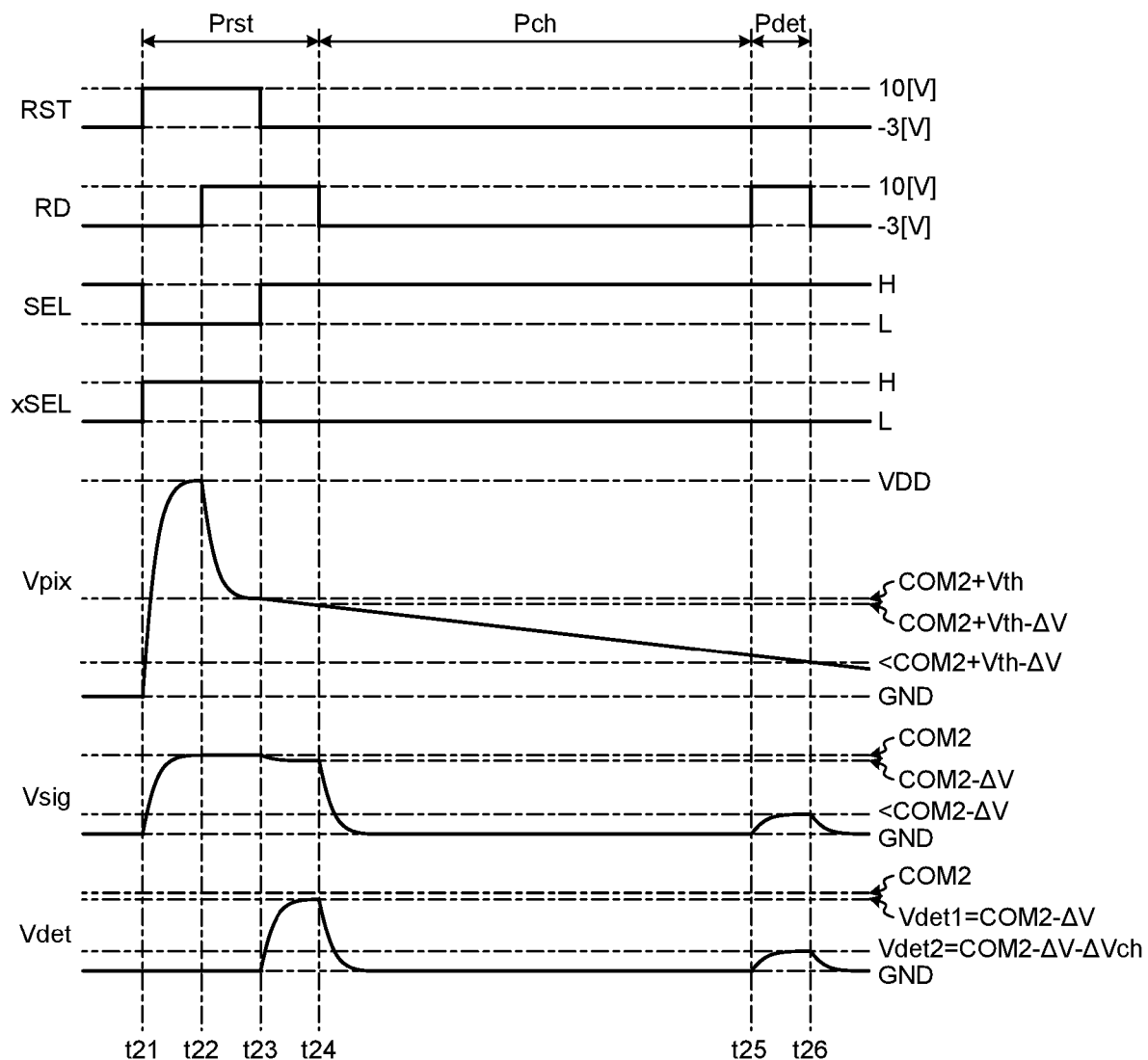
FIG. 9 is a timing waveform diagram illustrating an operation example of the detection element according to the embodiment.
Figure 10A:
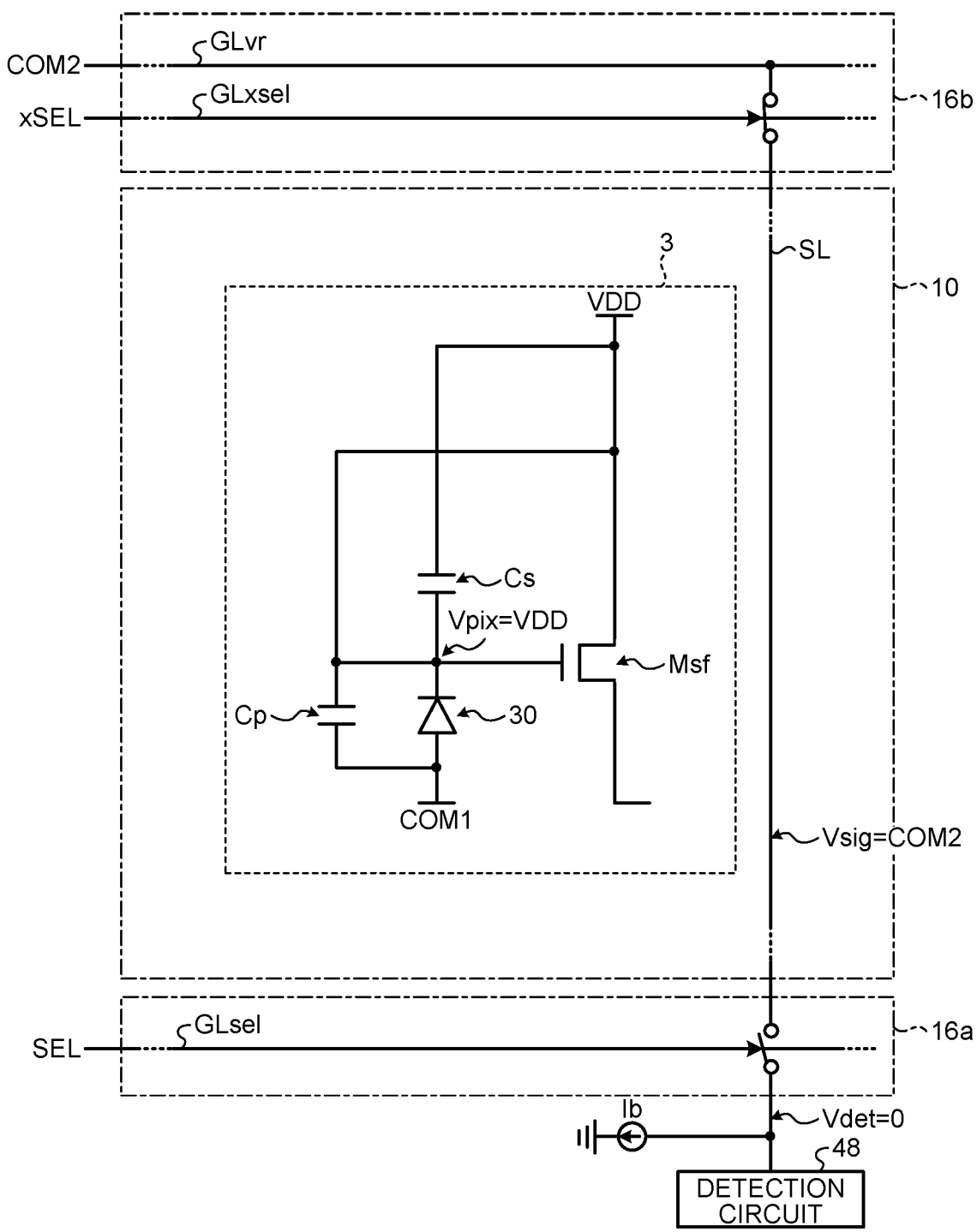
FIG. 10A is a diagram illustrating an equivalent circuit of the detection element during a period from t21 to t22 illustrated in FIG. 9.
Figure 10B:
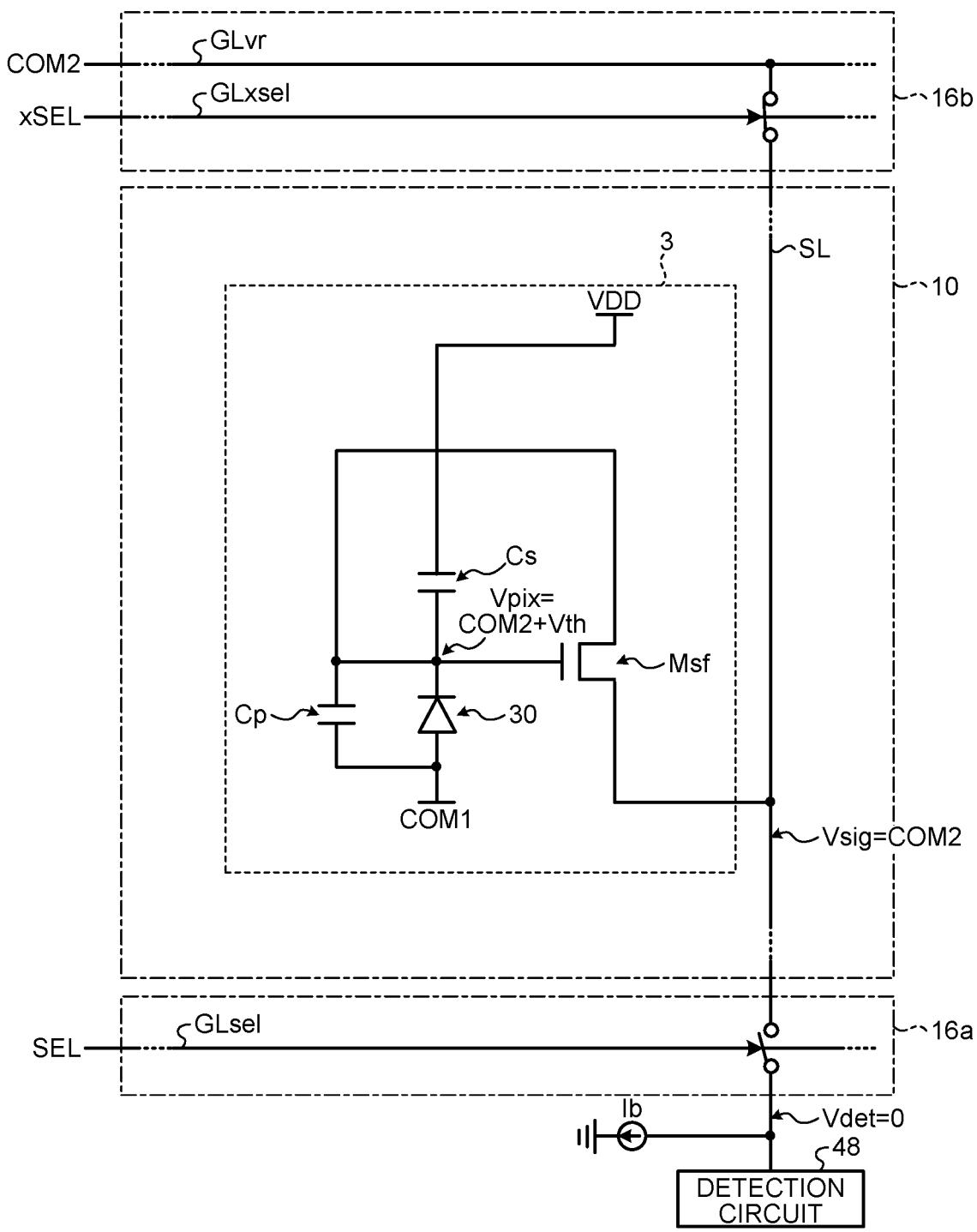
FIG. 10B is a diagram illustrating an equivalent circuit of the detection element during a period from t22 to t23 illustrated in FIG. 9.
Figure 10C:
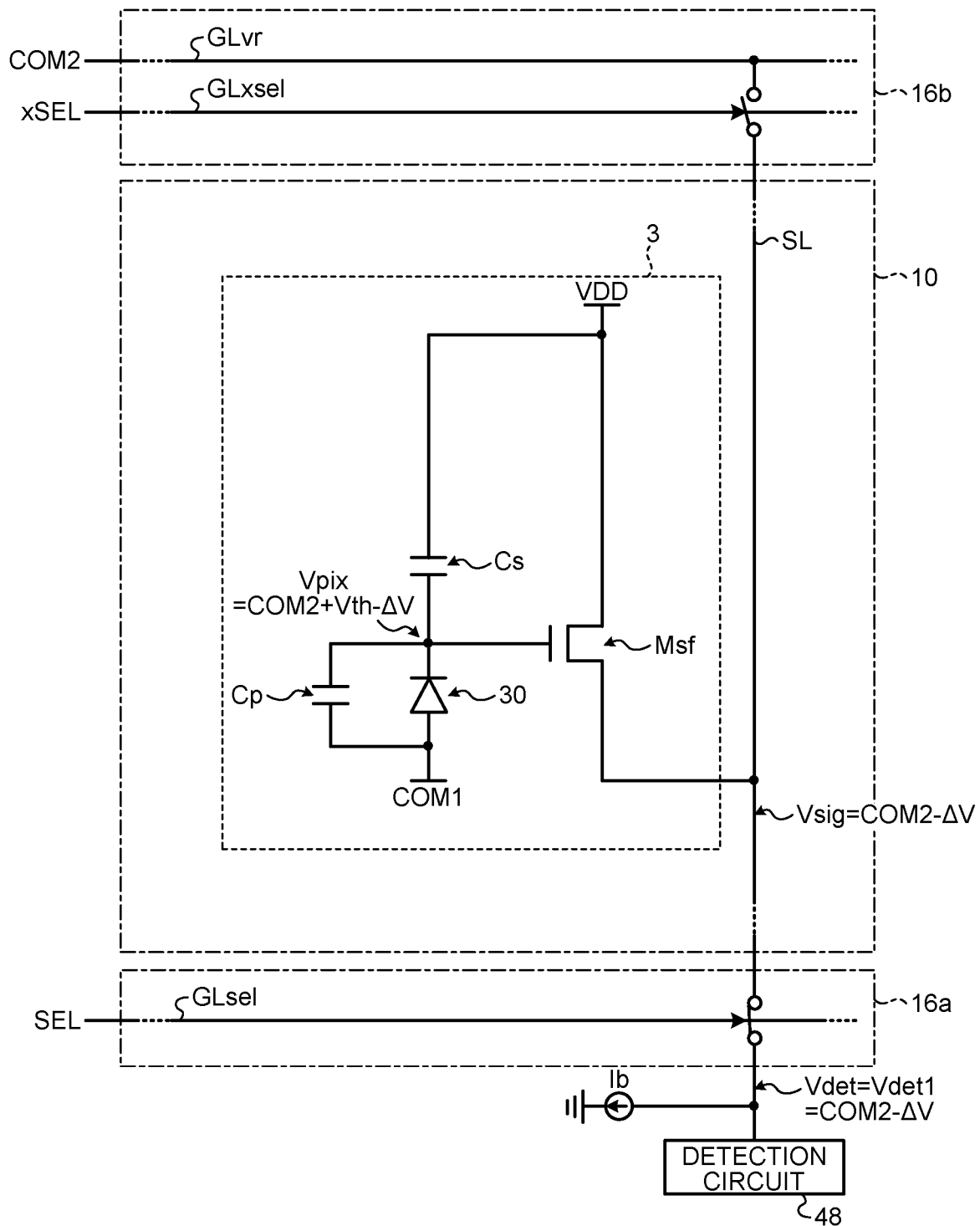
FIG. 10C is a diagram illustrating an equivalent circuit of the detection element during a period from t23 to t24 illustrated in FIG. 9.
Figure 10D:
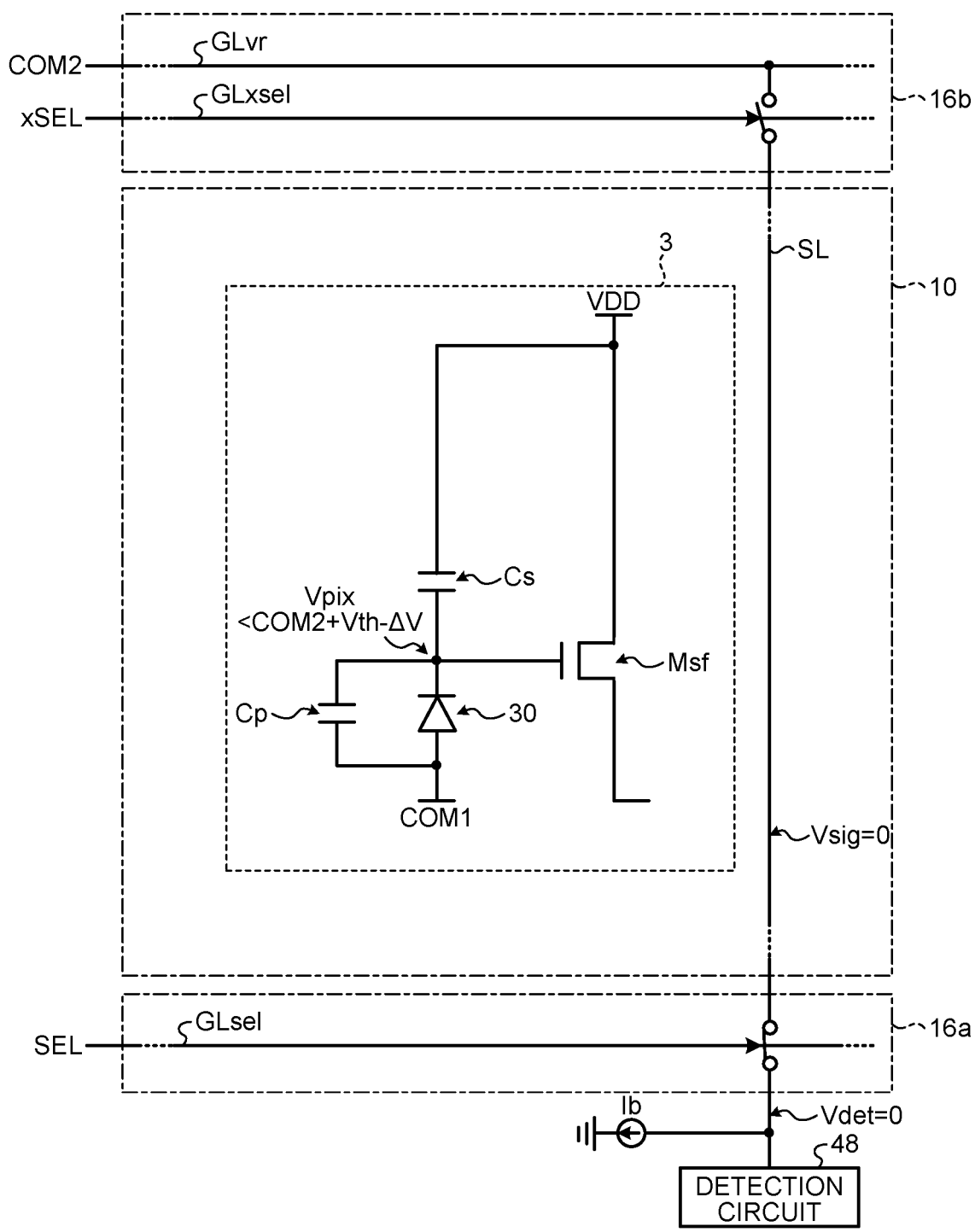
FIG. 10D is a diagram illustrating an equivalent circuit of the detection element during a period from t24 to t25 illustrated in FIG. 9.
Figure 10E:
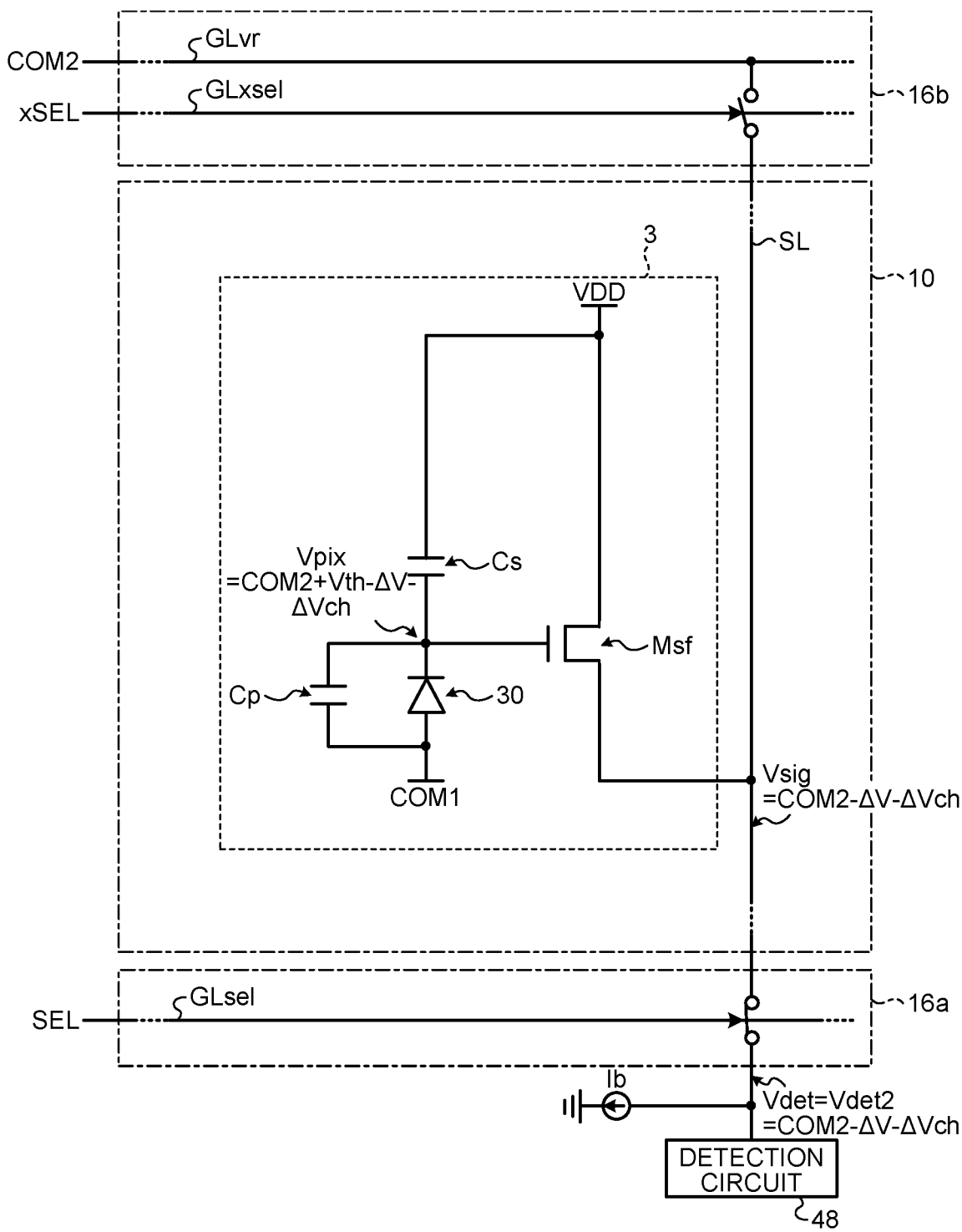
FIG. 10E is a diagram illustrating an equivalent circuit of the detection element during a period from t25 to t26 illustrated in FIG. 9.

FIG. 9 is a timing waveform diagram illustrating an operation example of the detection element according to the embodiment. FIG. 10A is a diagram illustrating an equivalent circuit of the detection element during a period from t21 to t22 illustrated in FIG. 9. FIG. 10B is a diagram illustrating an equivalent circuit of the detection element during a period from t22 to t23 illustrated in FIG. 9. FIG. 10C is a diagram illustrating an equivalent circuit of the detection element during a period from t23 to t24 illustrated in FIG. 9. FIG. 10D is a diagram illustrating an equivalent circuit of the detection element during a period from t24 to t25 illustrated in FIG. 9. FIG. 10E is a diagram illustrating an equivalent circuit of the detection element during a period from t25 to t26 illustrated in FIG. 9. The same description as that of the above-described comparative example will not be repeated.

The detection element 3 performs the detection in the order of the reset period Prst, the storage period Pch, and the read period Pdet. The power supply circuit 103 supplies the first reference voltage COM1 to the anode of the photoelectric conversion element 30 over the reset period Prst, the storage period Pch, and the read period Pdet. The reset period Prst is a period for setting, as the initial voltage, Vdet1 serving as the reference value of the voltage change amount of the detection signal Vdet corresponding to the light irradiating the photoelectric conversion element 30.

At time t21, the scan line drive circuit 15 sets the reset control signal RST to be supplied to the reset control scan line GLrst to the high-level voltage (for example, 10 [V]), and the control circuit 102 sets the first selection signal SEL to a low-level voltage "L" and the second selection signal xSEL to a high-level voltage "H". As a result, the reset period Prst starts. At this time, the reset transistor Mrst and the switch transistor Tr are turned on (into the conduction state). This operation sets the cathode voltage Vpix of the photoelectric conversion element 30 to the power supply voltage VDD as represented by Expression (11) below (refer to FIG. 10A).

$$V\text{pix}=VDD \tag{11}$$

At time t22, the scan line drive circuit 15 sets the read control signal RD to be supplied to the read control scan line GLrd to the high-level voltage (for example, 10 [V]). This operation turns on the read transistor Mrd (into the conduction state), and turns off the switch transistor Tr (into the non-conduction state).

As a result, at time t23, the cathode voltage Vpix of the photoelectric conversion element 30 is represented by Expression (12) below (refer to FIG. 10B). In Expression (12) below, Vth denotes the threshold voltage of the source follower transistor Msf.

$$V\text{pix}=COM2+Vth \tag{12}$$

At time t23, the scan line drive circuit 15 sets the reset control signal RST to be supplied to the reset control scan line GLrst to the low-level voltage (for example, −3 [V]), and the control circuit 102 sets the first selection signal SEL to the high-level voltage "H" and the second selection signal xSEL to the low-level voltage "L". As a result, the reset transistor Mrst is turned off (into the non-conduction state), and the switch transistor Tr is turned on (into the conduction state).

As a result, at time t24, the cathode voltage Vpix of the photoelectric conversion element 30 is represented by Expression (13) below (refer to FIG. 10C). At this time, the voltage Vsig of the output signal line SL, that is, the voltage Vdet1 of the detection signal Vdet output from the output signal line SL is represented by Expression (14) below (refer to FIG. 10C). In Expressions (13) and (14) below, ΔV denotes the variation component of the signal corresponding to the light irradiating the photoelectric conversion element 30 during a period from time t23 to time t24.

$$V\text{pix}=COM2+Vth-\Delta V \tag{13}$$

$$Vdet=Vdet1=COM2-\Delta V \tag{14}$$

At time t24, the scan line drive circuit 15 sets the read control signal RD to the low-level voltage. This operation turns off the read transistor Mrd (into the non-conduction state), and starts the storage period Pch (period from time t24 to time t25).

During the storage period Pch, the cathode voltage Vpix of the photoelectric conversion element 30 is represented by Expression (15) below, and the voltage Vsig of the output signal line SL is represented by Expression (16) below (refer to FIG. 10D).

$$V\text{pix}<COM2+Vth-\Delta V \tag{15}$$

$$Vsig=Vdet=0 \tag{16}$$

At time t25, the scan line drive circuit 15 sets the read control signal RD to the high-level voltage. This operation turns on the read transistor Mrd (into the conduction state) to start the read period Pdet (period from time t25 to time t26).

As a result, at time t26, the cathode voltage Vpix of the photoelectric conversion element 30 is represented by Expression (17) below (refer to FIG. 10E). At this time, the voltage Vsig of the output signal line SL, that is, the voltage Vdet2 of the detection signal Vdet output from the output signal line SL is represented by Expression (18) below (refer to FIG. 10E). In Expressions (17) and (18) below, ΔVch denotes the variation component of the signal corresponding to the light irradiating the photoelectric conversion element 30 during the storage period Pch and the read period Pdet (during the period from time t24 to time t26).

$$V\text{pix}=COM2+Vth-\Delta V-\Delta Vch \tag{17}$$

$$Vdet=Vdet2=COM2-\Delta V-\Delta Vch \tag{18}$$

Expression (19) below represents the difference between the voltage Vdet1 of the detection signal Vdet at time t24 (Expression (14) above) and the voltage Vdet2 of the detection signal Vdet at time t26 (Expression (18) above). The detector 40 performs the detection processing based on the difference ΔVch.

$$Vdet1-Vdet2=\Delta Vch \tag{19}$$

Figure 11:
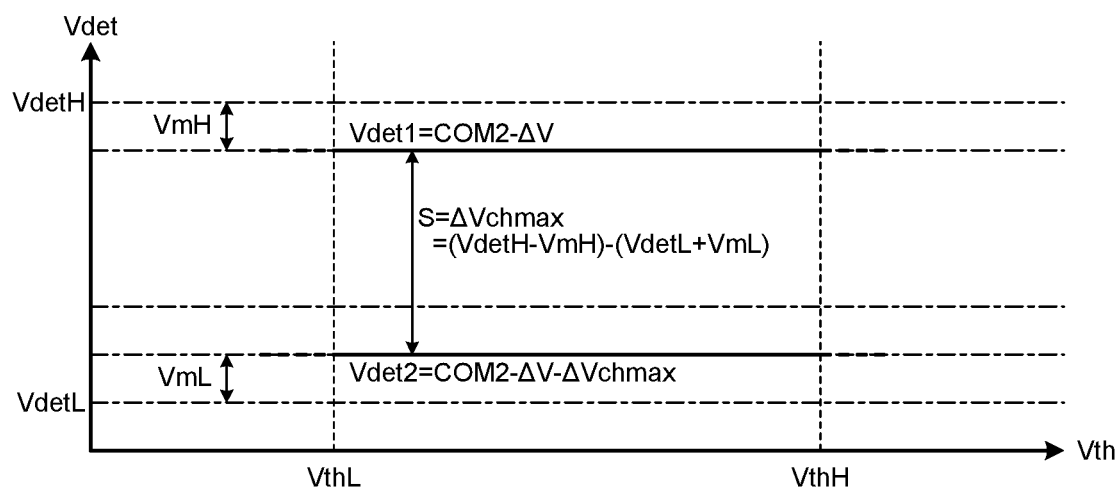
FIG. 11 is a diagram illustrating a relation between the detection range of the detection signal and the threshold voltage of the source follower transistor in the embodiment.

FIG. 11 is a diagram illustrating a relation between the detection range of the detection signal and the threshold voltage of the source follower transistor in the embodiment. In FIG. 11, the horizontal axis represents the threshold voltage Vth of the source follower transistor Msf, and the vertical axis represents the detection signal Vdet. In FIG. 11, VthH denotes the upper limit value of the threshold voltage Vth of the source follower transistor Msf, and VthL denotes the lower limit value of the threshold voltage Vth of the source follower transistor Msf. In FIG. 11, VdetH denotes the upper limit value of the detection range of the detection signal Vdet, and VdetL denotes the lower limit value of the detection range of the detection signal Vdet. The upper limit value VdetH of the detection range of the detection signal Vdet is set to, for example, 2.9 M. The lower limit value VdetL of the detection range of the detection signal Vdet is set to, for example, 0.4 M. VmH and VmL denote the voltage margins of the source follower transistor Msf taking into account the temperature characteristics and the reliability thereof. The voltage margins VmH and VmL are set to, for example, 0.4 [V]. That is, the detection range of the detection signal Vdet is set to be from VdetL+VmL (for example, 0.8 [V]) to VdetH−VmH (for example, 2.5 [V]).

In the detection element 3 according to the embodiment, the above-described voltages Vdet1 and Vdet2 of the detection signal Vdet do not include the threshold voltage Vth of the source follower transistor Msf. Consequently, as illustrated in FIG. 11, the detection sensitivity S, in other words, the substantial maximum detection range ΔVchmax of the detection signal Vdet is represented by Expression (20) below (refer to FIG. 11).

$$S=\Delta Vchmax=(VdetH-VmH)-(VdetL+VmL) \quad (20)$$

For example, when VdetH=2.9 [V], VdetL=0.4 [V], and the voltage margin VmH=VmL=0.4 [V], the detection sensitivity S (=ΔVchmax) results in 1.7 [V]. Thus, the detection sensitivity S can be increased more than that of the comparative example. As a result, the detection accuracy of the detection device 1 can be increased.

Specifically, for example, the storage period Pch can be shortened. As a result, time for authenticating the information on the living body such as the fingerprint can be reduced.

Specifically, for example, luminous intensity of light sources such as the illumination device 121 can be reduced. As a result, power consumption can be reduced.

Specifically, for example, the sensor area can be reduced. As a result, the resolution of the sensor 10 can be increased. Consequently, more detailed biological information such as sweat glands of the finger can be used for the authentication.

The components of the above-described embodiment can be combined as appropriate. Other operational advantages accruing from the aspects described in the embodiment that are obvious from the description herein, or that are conceivable as appropriate by those skilled in the art will naturally be understood as accruing from the present disclosure.

What is claimed is:

1. A detection device comprising:
    a plurality of detection elements arranged in a matrix having a row-column configuration in a detection region;
    a plurality of scan lines coupled to the detection elements arranged in a first direction and configured to supply a plurality of drive signals to the detection elements;
    a plurality of output signal lines coupled to the detection elements arranged in a second direction different from the first direction, detection signals from the detection elements being output to the output signal lines;
    a drive circuit configured to supply the drive signals to the detection elements; and
    a detection circuit configured to be supplied with the detection signals through the output signal lines,
    wherein each of the detection elements comprises
        a photoelectric conversion element,
        a source follower transistor configured to output a signal corresponding to an electrical charge generated in the photoelectric conversion element, and
        a read transistor configured to read the output signal of the source follower transistor and output the detection signal, and
    wherein, during a reset period, an initial voltage obtained by superimposing a predetermined reference voltage on a threshold voltage of the source follower transistor is applied to the photoelectric conversion element.

2. The detection device according to claim 1,
    wherein, during the reset period, the reference voltage supplied from the output signal line is applied to the detection element through the read transistor and the source follower transistor, and the initial voltage is set for the photoelectric conversion element.

3. The detection device according to claim 2, comprising a signal line selection circuit configured to switch a coupling partner of the output signal line between the detection circuit and a reference voltage supply line,
    wherein the signal line selection circuit is configured to, during the reset period, couple the output signal line to the reference voltage supply line to supply the reference voltage to the output signal line, and then, couple the output signal line to the detection circuit.

4. The detection device according to claim 1, comprising:
    a switch transistor configured to supply or shut off a predetermined power supply voltage to the source follower transistor; and
    a reset transistor configured to supply or shut off the power supply voltage to the photoelectric conversion element,
    wherein the drive signals comprise
        a read control signal to control the read transistor and the switch transistor, and
        a reset control signal to control the reset transistor and the switch transistor, and
    wherein the scan lines comprise
        read control scan lines each configured to supply the read control signal to the read transistor and the switch transistor, and
        reset control scan lines each configured to supply the reset control signal to the reset transistor and the switch transistor.

5. The detection device according to claim 4,
    wherein the drive circuit is configured to:
        during the reset period, control to turn on the reset transistor and the switch transistor, and then, control to turn off the switch transistor and turn on the read transistor, and further, control to turn off the reset transistor and turn on the switch transistor, and then, control to turn off the read transistor; and
        after a storage period subsequent to the reset period elapses, control to turn on the read transistor to start a read period.

* * * * *